(12) United States Patent
Fukumoto et al.

(10) Patent No.: US 6,786,571 B2
(45) Date of Patent: Sep. 7, 2004

(54) INK SET COMPRISING DARK YELLOW INK COMPOSITION

(75) Inventors: Hiroshi Fukumoto, Nagano-Ken (JP); Kazuhiko Kitamura, Nagano-Ken (JP); Miharu Kanaya, Nagano-Ken (JP); Shinichi Kato, Nagano-Ken (JP); Toshiaki Kakutani, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/187,711

(22) Filed: Jul. 2, 2002

(65) Prior Publication Data

US 2003/0035034 A1 Feb. 20, 2003

Related U.S. Application Data

(63) Continuation-in-part of application No. 09/539,886, filed on Mar. 31, 2000, now Pat. No. 6,592,212, which is a continuation-in-part of application No. PCT/JP01/07182, filed on Aug. 22, 2001.

(30) Foreign Application Priority Data

| Aug. 22, 2000 | (JP) | ................................. | 2000-251057 |
| Aug. 22, 2000 | (JP) | ................................. | 2000-251066 |
| Sep. 27, 2000 | (JP) | ................................. | 2000-294923 |
| Sep. 27, 2000 | (JP) | ................................. | 2000-294940 |
| Sep. 27, 2000 | (JP) | ................................. | 2000-294975 |
| Sep. 27, 2000 | (JP) | ................................. | 2000-294990 |
| Sep. 27, 2000 | (JP) | ................................. | 2000-294993 |

(51) Int. Cl.[7] ................. B41J 2/21; G01D 11/00

(52) U.S. Cl. ................................... 347/43; 347/100

(58) Field of Search .................... 347/43, 100, 96; 106/31.13, 31.6, 31.75, 31.76

(56) References Cited

U.S. PATENT DOCUMENTS

| 5,825,377 A | * 10/1998 | Gotoh et al. ............... 347/15 |
| 6,478,862 B1 | * 11/2002 | Elwakil ................. 106/31.6 |
| 6,482,256 B1 | * 11/2002 | Kanaya et al. ......... 106/31.51 |

FOREIGN PATENT DOCUMENTS

| EP | 1043164 | 10/2000 |
| JP | 959548 | 3/1997 |
| JP | 6319288 | 1/1998 |

OTHER PUBLICATIONS

Patent Abstract of Japan Publication No.: 09059548 Published Mar. 4, 1997.
Patent Abstract of Japan Publication No.: 63019288 Published Jan. 27, 1988.

* cited by examiner

Primary Examiner—Thinh Nguyen
(74) Attorney, Agent, or Firm—Ladas & Parry

(57) ABSTRACT

Disclosed is an ink set comprising at least a normal yellow ink composition and a dark yellow ink composition, the lightness of the dark yellow ink composition being lower than that of the normal yellow ink composition. This ink set can realize recorded images having excellent color reproduction and image reproduction.

63 Claims, 1 Drawing Sheet

(a)

(b)

(c)

(d)

(e)

(f)

INK SET COMPRISING DARK YELLOW INK COMPOSITION

This is a continuation-in-part application based on U.S. patent application Ser. No. 09/539,886 filed on Mar. 31, 2000 now U.S. Pat. No. 6,592,212 and PCT Application No.PCT/JP01/07182 filed on Aug. 22, 2001.

BACKGROUND OF THE INVENTION

1. Field of the Invention

The present invention relates to an ink set comprising at least two yellow ink compositions different from each other in lightness.

2. Background Art

Ink jet recording is a printing method wherein droplets of an ink composition are ejected and deposited on recording media, such as paper, to perform printing. The feature of the ink jet recording method is that images having a combination of high resolution with high quality can be printed at a high speed by means of a relatively inexpensive apparatus. Ink jet recording apparatuses utilizing this method have been commercially widely accepted by virtue of good print quality, low cost, relatively quiet operation, and capability of forming graphics.

In recent years, a method has been carried out wherein a plurality of color ink compositions are provided and used to form color images by ink jet recording. In general, color images are formed using three colors of a yellow ink composition (Y), a magenta ink composition (M), and a cyan ink composition (C), or optionally four colors of a yellow ink composition (Y), a magenta ink composition (M), a cyan ink composition (C), and a black ink composition (K).

In the recording method using these ink compositions, hue and lightness, which are measures of colors, are regulated by the following method to print images including a wide range of natural colors. Hue, that is, the so-called "color" such as red or blue, is regulated by varying the ratio of color dots of cyan, magenta, and yellow ejected from an ink head. The lightness, that is, brightness, is regulated by varying the density of dots formed. The regulation of the density of each color dot formed on a recording medium in this way can realize printing of images including a wide range of natural colors.

Further, in recent years, color images have become formed using six colors of the above four color ink compositions and, in addition, a cyan ink composition having low color density (a light cyan ink composition) and a magenta ink composition having low color density (a light magenta ink composition), or using seven colors of the above six colors and a yellow ink composition having low color density (a light yellow ink composition). These ink compositions used for the formation of color images as such should exhibit good color development, and, in addition, these ink compositions, when used in combination with a plurality of ink compositions, should develop good intermediate colors. That is, in the ink compositions and an ink set using these ink compositions, faithful image reproduction and a wide color reproduction range are desired.

SUMMARY OF THE INVENTION

The present inventors have now found that the use of two yellow ink compositions different from each other in lightness, that is, the use of a yellow ink composition in combination with a dark yellow ink composition having lower lightness than the yellow ink composition, can realize images having good quality, especially can prevent the occurrence of graininess in recorded images and can significantly broaden the color reproduction range of images. The present invention has been made based on such finding.

Accordingly, it is an object of the present invention to provide an ink set which can realize images having good quality, especially color images with a wide color reproduction range and excellent image reproduction.

According to one aspect of the present invention, there is provided an ink set comprising at least a normal yellow ink composition and a dark yellow ink composition, the lightness of the dark yellow ink composition being lower than that of the normal yellow ink composition.

According to another aspect of the present invention, there is provided an ink set comprising at least a normal yellow ink composition and a dark yellow ink composition, wherein for the dark yellow ink composition, the absolute value of $b^*/a^*$ in the $L^*a^*b^*$ color system as calculated from the spectral characteristics of a 1000-fold dilution of the dark yellow ink composition with water is not less than 0.83, and the $b^*$ value is not less than zero (0) and is smaller than the $b^*$ value of the normal yellow ink composition as calculated from the spectral characteristics of a 1000-fold dilution of the normal yellow ink composition with water.

BRIEF DESCRIPTION OF THE DRAWINGS

FIGS. 1a to 1f are perspective views illustrating preferred embodiments of the ink cartridge according to the present invention, wherein FIG. 1a shows an ink cartridges comprising ink reservoirs respectively for six colors of a dark yellow ink composition (DY), a normal yellow ink composition (Y), a light magenta ink composition (LM), a magenta ink composition (M), a light cyan ink composition (LC), and a cyan ink composition (C), FIG. 1b an ink cartridge composed of only an ink reservoir for a dark yellow ink composition (DY), FIG. 1c an ink cartridge comprising ink reservoirs respectively for three colors of a dark yellow ink composition (DY), a light cyan ink composition (LC), and a light magenta ink composition (LM), FIG. 1d an ink cartridge comprising ink reservoirs respectively for two colors of a dark yellow ink composition (DY) and a yellow ink composition (Y), FIG. 1e an ink cartridge comprising ink reservoirs respectively for four colors of a dark yellow ink composition (DY), a yellow ink composition (Y), a magenta ink composition (M), and a cyan ink composition (C), and FIG. 1f an ink cartridge comprising ink reservoirs respectively for two colors of a black ink composition (K) and a dark yellow ink composition (DY).

DETAILED DESCRIPTION OF THE INVENTION

Ink Set

Figure 1:
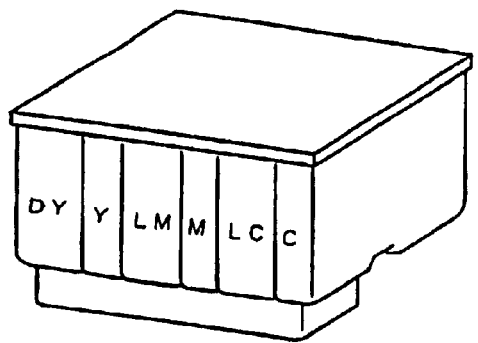
Figure 1:
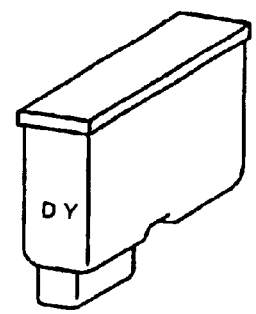
Figure 1:
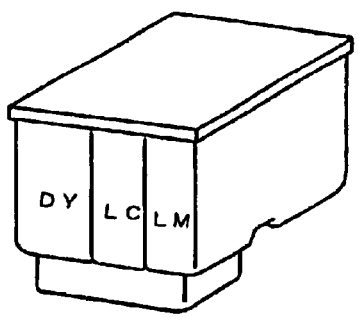
Figure 1:
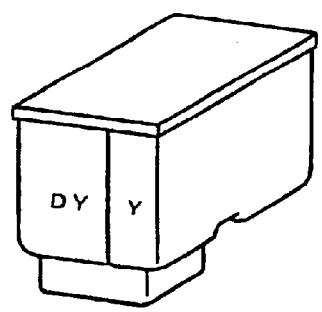
Figure 1:
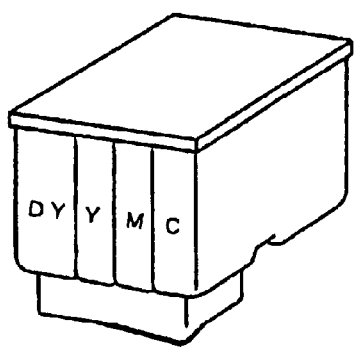
Figure 1:
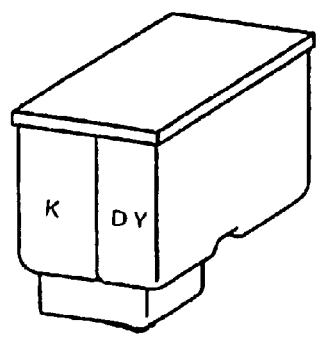

The ink set according to the present invention is used in recording methods using an ink composition. Recording methods using the ink compositions include, for example, an ink jet recording method, a recording method using writing utensils, such as pens, and other various printing methods. Preferably, the ink set according to the present invention is used in an ink jet recording method.

The ink set according to the present invention comprises at least a normal yellow ink composition and a dark yellow ink composition. The dark yellow ink composition referred to herein will be described later.

In the ink set according to the first aspect of the present invention, the lightness of the dark yellow ink composition should be lower than that of the normal yellow ink composition.

In the ink set according to the second aspect of the present invention, for the dark yellow ink composition, the absolute value of b*/a* in the L*a*b* color system as calculated from the spectral characteristics of a 1000-fold dilution of the dark yellow ink composition with water, that is, |b*/a*|, is not less than 0.83, preferably not less than 1.19, and the b* value is not less than zero (0), preferably 10 to 50. Further, in the ink set according to the second aspect of the present invention, the b* value as calculated from the spectral characteristics of a 1000-fold dilution of the dark yellow ink composition with water is smaller than the b* value of the normal yellow ink composition as calculated from the spectral characteristics of a 1000-fold dilution of the normal yellow ink composition with water.

In general, when an image in its bright region (a highlight region) is printed using only four color inks of cyan (C), magenta (M), yellow (Y), and black (K), dots of C, M, and K should be sparsely formed. Therefore, these dots are noticeable, often leading to deteriorated image quality. Further, sparsely forming dots is disadvantageous in that details of image information cannot be reproduced.

For this reason, color images have been formed using six colors of the above four color ink compositions and, in addition, light cyan ink (LC) and light magenta ink (LM), or using seven colors of the above six colors and light yellow ink (LY) to improve the quality of recorded images. When these light inks are used in reproducing an image in its highlight region, as compared with the case where only four colors are used, dots can be formed at higher density and, in addition, the details of image information can be reproduced.

However, unlike the case of the highlight region, it is generally difficult to improve the quality of images including low-lightness region (shadow region) through the utilization of LC, LM, and LY. The reason for this is as follows. For the image in its shadow region, unlike the highlight region, there is substantially no need to sparsely form ink dots. Therefore, the means adopted in the highlight region is not useful for improving the image quality in the shadow region. Further, an improvement in image quality in the highlight region makes it necessary to further improve the quality of the image in its shadow region.

In reproducing intermediate colors by the ink recording method, in general, a plurality of inks among the above-described four color ink compositions or six color ink compositions are used in combination to reproduce a contemplated color. In this case, for some desired intermediate colors, the number of types and amounts of inks necessary for reproducing the desired color is large, and, in some cases, this disadvantageously increases the amount of ink impacted, per unit area, into a recording medium. In particular, when an improvement in the quality of an image in its shadow region is contemplated, the amount of ink impacted should be in some cases made larger than that in the prior art technique.

In the recording medium, however, there is a limitation on the total amount of ink which can be impacted per unit area (hereinafter often referred to as "ink duty limit"), and, thus, the density of dots formed cannot be unconditionally increased. When ink recording is performed on a recording medium in an amount exceeding the ink duty limit, there is a fear of causing feathering or bleeding of ink in the record which leads to lowered image quality.

For this reason, in order to ensure print quality, the amount of ink impacted should not exceed the ink duty limit. The limitation of the amount of the ink used inevitably leads to a limitation on color development and color reproduction range of recorded images. This makes it difficult to improve the quality of an image in its shadow region. Positively using inks having high color density is considered effective for improving the color development and broadening the color reproduction range. In general, however, increasing the amount of inks having high color density used is likely to cause such a state that, in the recorded image, ejected ink dots are visible with the naked eye, that is, the recorded image suffers from high graininess. Therefore, the image quality is lowered.

According to the present invention, the use of the dark yellow ink composition enables a color, which has hitherto been rendered by a combination of several inks, to be rendered by using dark yellow ink as a base in combination with other ink. Therefore, the same color can be rendered by using a smaller amount of ink. In this way, when color can be reproduced by a smaller amount of ink, different inks can be further used under ink duty limitation. This contributes to further improved quality and color reproduction of recorded images. The use of the dark yellow ink composition according to the present invention is advantageous in that a wide range of color reproduction can be realized in the shadow region of images.

According to the present invention, colors in regions, which have hitherto been reproduced by using inks having high color density, for example, magenta ink (particularly magenta ink having high color density), cyan ink (particularly cyan ink having high color density), and black ink, can be rendered by using the dark yellow ink composition instead of these inks. Therefore, color regions, where the use of inks having high color density is required, can be reduced. By virtue of this, in recorded images, it is considered that the formation of images suffering from high graininess, which is likely to be experienced in images yielded using inks having high color density, can be suppressed, whereby the image reproduction can be improved.

Specifically, in the present invention, the provision of a dark yellow ink composition in combination with a conventional yellow ink composition, that is, a normal yellow ink composition, followed by color printing using these two yellow ink compositions can reduce the graininess of prints and can broaden a color reproduction range, as compared with color printing by the prior art technique wherein a single yellow ink composition is used.

Further, in the ink set according to the present invention, since the dark yellow ink composition is used in combination with the normal yellow ink composition, the yellow ink compositions can be impacted into a recording medium in a superimposition manner. Therefore, unlike the prior art technique wherein a single yellow ink composition is used, the color development (or tint) of the formed recorded image can be improved.

Dark Yellow Ink Composition

In the present invention, basically, any of ingredients and compositions adopted in conventional yellow ink compositions may be selected for the dark yellow ink composition so far as the above-described lightness requirement or the above-described hue requirement in an L*a*b* color system is satisfied. Therefore, the same ingredients as adopted in a normal yellow ink composition described below may be adopted.

In the present invention, the "normal yellow ink composition" is a term which is used in comparison with the dark yellow ink composition, and may be any of conventional yellow ink compositions so far as the yellow ink composition can be used in combination with the dark yellow ink composition. The normal yellow ink composition according to the present invention, when spectroscopically analyzed on a 1000-fold dilution thereof with water, has an absorbance of not less than 1.0 in the wavelength range of 350 to 500 nm.

The lightness and hue of the ink composition according to the present invention are specified by a color difference specifying method using an L*a*b* color system which has been standardized by CIE (Commission International del'Eclairage) and adopted in JIS (i.e., JIS Z 8729).

In the present invention, the "lightness (and hue) of ink composition" preferably refers to "lightness (and hue) in an L*a*b* color system as calculated from the spectral characteristics of a 1000-fold dilution of an ink composition with water" or "lightness (and hue) in an L*a*b* color system as calculated from the spectral characteristics of a record produced by evenly impacting ink at 1.48 to 2.22 mg/cm$^2$ into a recording medium having a whiteness W of not less than 90."

Here the "lightness (and hue) in an L*a*b* color system as calculated from the spectral characteristics of a 1000-fold dilution of an ink composition with water" refers to lightness (L* value) (and hue (L*a*b*)) as calculated from the results of a spectral analysis of a 1000-fold (on a volume basis) dilution of an ink composition with water by means of a spectrophotometer (cell: quartz cell with an optical path length of 1 cm). Further, in the present invention, the L* value, a* value, and b* value of the dilution are determined. In this case, pure water obtained by ion exchange, ultrafiltration, reverse osmosis, distillation or the like, or ultrapure water may be used as water for dilution.

The "lightness (and hue) in an L*a*b* color system as calculated from the spectral characteristics of a record produced by evenly impacting ink at 1.48 to 2.22 mg/cm$^2$ into a recording medium having a whiteness W of not less than 90" refers to lightness (L* value) (and hue (L*a*b*)) as calculated from the results of a spectral analysis, by means of a measuring apparatus, for example, a GRETAG densitometer SPM-50 manufactured by GRETAG, Ltd., of a record produced by impacting ink at 1.48 to 2.22 mg/cm$^2$, preferably at 1.85 mg/cm$^2$, into a recording medium having a whiteness W of not less than 90 specified by a method which has been standardized by CIE and adopted in JIS (i.e., JIS Z 8715).

According to a preferred embodiment of the present invention, when the "lightness of ink composition" is "lightness in an L*a*b* color system as calculated from the spectral characteristics of a 1000-fold dilution of an ink composition with water," the difference in lightness (L* value) between the normal yellow ink composition and the dark yellow ink composition is preferably 10 to 70, more preferably 20 to 60, still more preferably 20 to 30. In this case, as described above, the lightness of the dark yellow ink composition and the lightness of the normal yellow ink composition may be any respective values so far as the lightness of the dark yellow ink composition is lower than that of the normal yellow ink composition and, at the same time, the difference in lightness between these yellow ink compositions is as described above.

According to a preferred embodiment of the present invention, the lightness in the L*a*b* color system as calculated from the spectral characteristics of a 1000-fold dilution of the dark yellow ink composition with water is 20 to 90, more preferably 30 to 80, most preferably 30 to 70.

The lightness in the L*a*b* color system as calculated from the spectral characteristics of a 1000-fold dilution of the normal yellow ink composition with water is preferably not less than 90, more preferably not less than 95.

According to a preferred embodiment of the present invention, when the "lightness of the ink composition" is "lightness in an L*a*b* color system as calculated from the spectral characteristics of a record produced by evenly impacting ink at 1.48 to 2.22 mg/cm$^2$ into a recording medium having a whiteness W of not less than 90," the difference in lightness (L* value) between the normal yellow ink composition and the dark yellow ink composition is preferably 20 to 70, more preferably 30 to 70, still more preferably 50 to 70. Here the difference in lightness between the normal yellow ink composition and the dark yellow ink composition refers to a value obtained by measuring the lightness of a record produced by impacting a normal yellow ink composition into the above recording medium and the lightness of a record produced by impacting a dark yellow ink composition into the above recording medium at the same weight per unit area as in the case of the normal yellow ink composition and determining the difference between these lightness values. In this case, as described above, the lightness of the dark yellow ink composition and the lightness of the normal yellow ink composition may be any respective values so far as the lightness of the dark yellow ink composition is lower than that of the normal yellow ink composition and, at the same time, the difference in lightness between these yellow ink compositions is as described above.

According to another preferred embodiment of the present invention, the dark yellow ink composition, when spectroscopically analyzed on a 1000-fold dilution thereof with water, preferably has at least one absorption maximum in the wavelength range of 350 to 500 nm. Here the spectral analysis may be carried out, for example, by diluting an ink composition 1000 times with ion-exchange water and spectroscopically analyzing the dilution with a spectrophotometer (Model U-3000, manufactured by Hitachi Ltd.). Thus, since an absorption maximum exists in the 350 to 500 nm wavelength range, light in the wavelength range exhibiting blue is absorbed. Therefore, the dark yellow ink composition can have a component of yellow which is a complementary color of blue.

According to a further preferred embodiment of the present invention, in the spectroscopic analysis of a 1000-fold dilution of the dark yellow ink composition with water, the absorption maximum value in the wavelength range of 350 to 500 nm is preferably larger than the absorption value in the wavelength range of 500 to 780 nm.

According to another preferred embodiment of the present invention, in the spectroscopic analysis of a 1000-fold dilution of the dark yellow ink composition with water, an absorption maximum exists in the wavelength range of 350 to 500 nm and, in addition, in the wavelength range of 500 to 780 nm, and the absorption maximum value in the wavelength range of 350 to 500 nm is preferably larger than that in the wavelength range of 500 to 780 nm.

Here the absorption maximum refers to a point which shows the maximum absorbance within the predetermined wavelength range, and the absorption maximum value refers to a absorbance value at that time.

Thus, within a visible light region, the absorption of light in the 350 to 500 nm wavelength range exhibiting blue is relatively larger, and, thus, in the dark yellow ink composition, the hue of yellow, which is a complementary color of blue, is stronger.

According to a further preferred embodiment of the present invention, in the spectral analysis of a 1000-fold dilution of the dark yellow ink composition with water, the integration value of the spectral characteristics in the wavelength range of 350 to 500 nm is preferably 1.5 to 10 times, more preferably 2 to 5 times, the integration value of the spectral characteristics in the wavelength range of 500 to 780 nm. Here the integration value of the spectral characteristics is determined as the area of a portion surrounded by the spectral characteristics and the wavelength range in the spectral analysis.

According to another preferred embodiment of the present invention, as described above, the hue of the ink composition may be specified by lightness requirement of the ink composition and, in addition, a* and b* values of the L*a*b* color system as calculated from the spectral characteristics of a 1000-fold dilution of the ink composition with water. Further, the hue of the ink composition may also be specified by lightness (L* value) and a* and b* values of the L*a*b* color system as calculated from the spectral characteristics of a 1000-fold dilution of the ink composition with water.

In this case, preferably, the absolute value of b*/a* in the L*a*b* color system of the dark yellow ink composition as calculated from the spectral characteristics of a 1000-fold dilution of the dark yellow ink composition with water, that is, |b*/a*|, is not less than 0.83, preferably not less than 1.19, and the b* value is preferably not less than zero (0), more preferably 10 to 50. When the absolute value of b*/a* and the b* value fall within the above respective ranges, printing with a wide color reproduction range and a high level of image reproduction can be advantageously realized.

According to another preferred embodiment of the present invention, the b* value of the dark yellow ink composition as calculated from the spectral characteristics of a 1000-fold dilution of the dark yellow ink composition with water is smaller than the b* value of the normal yellow ink composition as calculated from the spectral characteristics of a 1000-fold dilution of the normal yellow ink composition with water.

As described above, in the ink set according to the second aspect of the present invention, the hue (L*a*b*) of the ink composition can be specified by the L*a*b* color system as calculated from the spectral characteristics of a 1000-fold dilution of the ink composition with water without specifying by the requirement of the lightness of the ink composition. That is, as described above, in the ink set according to the second aspect of the present invention, the dark yellow ink composition should satisfy a requirement such that the absolute value of b*/a* in the L*a*b* color system as calculated from the spectral characteristics of a 1000-fold dilution of the dark yellow ink composition with water, that is, |b*/a*|, is not less than 0.83, preferably not less than 1.19, and the b* value is not less than zero (0), preferably 10 to 50. Further, in the ink set according to the second aspect of the present invention, the b* value of the dark yellow ink composition as calculated from the spectral characteristics of a 1000-fold dilution of the dark yellow ink composition with water should be smaller than the b* value of the normal yellow ink composition as calculated from the spectral characteristics of a 1000-fold dilution of the normal yellow ink composition with water.

Further, in the present invention, the difference between the b* value as calculated from the spectral characteristics of a 1000-fold dilution of the normal yellow ink composition with water and the b* value as calculated from the spectral characteristics of a 1000-fold dilution of the dark yellow ink composition with water is preferably not less than 20. Satisfying this hue requirement can realize a wider color reproduction range.

In the present invention, the normal yellow ink composition also can be specified by a color difference specifying method using the L*a*b* color system. In this case, the absolute value of b*/a* in the L*a*b* color system of the normal yellow ink composition as calculated from the spectral characteristics of a 1000-fold dilution of the normal yellow ink composition with water is preferably not less than 1.73, more preferably not less than 2.75, and the b* value is preferably not less than 50, more preferably 60 to 90.

According to a further preferred embodiment of the present invention, the b* value of the dark yellow ink composition is in the range of 10 to 50, and the b* value of the normal yellow ink composition is in the range of 60 to 90.

According to another preferred embodiment of the present invention, the hue (L*a*b*) of the ink composition is specified by an L*a*b* color system as calculated from the spectral characteristics of a record produced by impacting ink at 1.48 to 2.22 mg/cm$^2$, preferably at 1.85 mg/cm$^2$, into a recording medium having a whiteness W of not less than 90.

In this case, preferably, the absolute value of b*/a* in the L*a*b* color system of the dark yellow ink composition, that is, |b*/a*|, is not less than 0.83, more preferably not less than 1.19, and the b* value is preferably not less than zero (0). When the absolute value of b*/a* and the b* value fall within the above respective ranges, printing with a wide color reproduction range and a high level of image reproduction can be advantageously realized.

According to another preferred embodiment of the present invention, the b* value of the dark yellow ink composition as calculated from the spectral characteristics of a record produced by the above method is smaller than the b* value of the normal yellow ink composition as calculated by the same method as described above.

Further, in the present invention, the difference between the b* value of the normal yellow ink composition as calculated from the spectral characteristics of a record produced by the above method and the b* value of the dark yellow ink composition as calculated by the same method as described above is preferably not less than 30. Satisfying this hue requirement can realize a wider color reproduction range.

Further, in the present invention, the absolute value of b*/a* in the L*a*b* color system of the normal yellow ink composition as calculated from the spectral characteristics of a record produced by the above method is not less than 1.73, preferably not less than 2.75, and the b* value is preferably not less than 40.

According to a preferred embodiment of the present invention, the dark yellow ink composition comprises at least a colorant, a water-soluble organic solvent, and water.

Colorant

In the present invention, the colorant used in the dark yellow ink composition may be properly selected from dyes or pigments. If necessary, dyes and pigments may be used in proper combination with each other.

In the present invention, dyes usable herein include various dyes commonly used in ink jet recording, for example, direct dyes, acid dyes, foodstuff dyes, basic dyes, reactive dyes, disperse dyes, vat dyes, and soluble vat dyes.

In the dark yellow ink composition according to the present invention, when a dye is used as the colorant, the amount of the dye added to the ink composition is preferably 0.2 to 20% by weight, more preferably 0.5 to 10% by weight.

On the other hand, regarding the pigment, inorganic and organic pigments are usable without particular limitation. Examples of inorganic pigments usable herein include, in addition to titanium oxide and iron oxide, carbon blacks produced by known processes, such as contact, furnace, and thermal processes. Examples of organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

These pigments may be added, to the ink composition, in the form of a pigment dispersion prepared by dispersing the pigment in an aqueous medium with the aid of a dispersant or a surfactant. Dispersants usable herein include those commonly used in the preparation of pigment dispersions, for example, polymeric dispersants.

Examples of preferred dispersants include cationic dispersants, anionic dispersants, and nonionic dispersants. Examples of anionic dispersants include polyacrylic acid, polymethacrylic acid, acrylic acid/acrylonitrile copolymer, vinyl acetate/acrylic ester copolymer, acrylic acid/acrylic alkyl ester copolymer, styrene/acrylic acid copolymer, styrene/methacrylic acid copolymer, styrene/acrylic acid/ acrylic alkyl ester copolymer, styrene/methacrylic acid/ acrylic alkyl ester copolymer, styrene/α-methylstrene/ acrylic acid copolymer, styrene/α-methylstyrene/acrylic acid/acrylic alkyl ester copolymer, styrene/maleic acid copolymer, vinylnaphthalene/maleic acid copolymer, vinyl acetate/ethylene copolymer, vinyl acetate/fatty acid vinyl- ethylene copolymer, vinyl acetate/maleic ester copolymer, vinyl acetate/crotonic acid copolymer, and vinyl acetate/ acrylic acid copolymer. Examples of anionic surfactants include sodium dodecylbenzenesulfonate, sodium laurylate, and ammonium salt of polyoxyethylene alkyl ether sulfates. Examples of nonionic surfactants include polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylene- alkylamides. They may be used alone or in a combination of two or more. According to a preferred embodiment of the present invention, the utilization of a water-soluble styrene- (meth)acrylic acid resin as a dispersant is preferred.

It would be apparent to a person having ordinary skill in the art that the dispersant and the surfactant contained in the pigment dispersion would function also as a dispersant and a surfactant for the ink composition.

In the dark yellow ink composition according to the present invention, when the pigment is used as the colorant, the amount of the pigment added to the ink composition is preferably 0.1 to 20% by weight, more preferably 0.2 to 10% by weight.

In the present invention, a single type of dye or pigment may be selected as the colorant from the above group of dyes and the above group of pigments. Alternatively, a method may be used wherein a single type or plurality of types of dyes and/or pigments are selected from the above group of dyes and the above group of pigments and they are used in combination.

According to the present invention, in the dark yellow ink composition, any colorant may be used so far as the above- described lightness and/or the hue can be rendered. Therefore, the dark yellow ink composition can be produced without the use of any yellow colorant. According to a preferred embodiment of the present invention, however, the dark yellow ink composition preferably contains at least a yellow colorant as the colorant. Therefore, the dark yellow ink composition may be produced by adding a suitable amount of a magenta colorant and a cyan colorant to the yellow colorant, or by adding a suitable amount of a black colorant to a yellow colorant. Here the yellow colorant refers to a dye or a pigment which can develop the so-called "yellow color."

In the present invention, specific examples of yellow colorants, that is, yellow dyes and pigments, include: C.I. Acid Yellow 1, C.I. Acid Yellow 3, C.I. Acid Yellow 11, C.I. Acid Yellow 17, C.I. Acid Yellow 19, C.I. Acid Yellow 23, C.I. Acid Yellow 25, C.I. Acid Yellow 29, C.I. Acid Yellow 36, C.I. Acid Yellow 38, C.I. Acid Yellow 40, C.I. Acid Yellow 42, C.I. Acid Yellow 44, C.I. Acid Yellow 49, C.I. Acid Yellow 59, C.I. Acid Yellow 61, C.I. Acid Yellow 70, C.I. Acid Yellow 72, C.I. Acid Yellow 75, C.I. Acid Yellow 76, C.I. Acid Yellow 78, C.I. Acid Yellow 79, C.I. Acid Yellow 98, C.I. Acid Yellow 99, C.I. Acid Yellow 110, C.I. Acid Yellow 111, C.I. Acid Yellow 127, C.I. Acid Yellow 131, C.I. Acid Yellow 135, C.I. Acid Yellow 142, C.I. Acid Yellow 162, C.I. Acid Yellow 164, and C.I. Acid Yellow 165; C.I. Direct Yellow 1, C.I. Direct Yellow 8, C.I. Direct Yellow 11, C.I. Direct Yellow 12, C.I. Direct Yellow 24, C.I. Direct Yellow 26, C.I. Direct Yellow 27, C.I. Direct Yellow 33, C.I. Direct Yellow 39, C.I. Direct Yellow 44, C.I. Direct Yellow 50, C.I. Direct Yellow 58, C.I. Direct Yellow 85, C.I. Direct Yellow 86, C.I. Direct Yellow 87, C.I. Direct Yellow 88, C.I. Direct Yellow 89, C.I. Direct Yellow 98, C.I. Direct Yellow 110, C.I. Direct Yellow 142, and C.I. Direct Yellow 144; C.I. Reactive Yellow 1, C.I. Reactive Yellow 2, C.I. Reactive Yellow 3, C.I. Reactive Yellow 4, C.I. Reactive Yellow 6, C.I. Reactive Yellow 7, C.I. Reactive Yellow 11, C.I. Reac- tive Yellow 12, C.I. Reactive Yellow 13, C.I. Reactive Yellow 14, C.I. Reactive Yellow 15, C.I. Reactive Yellow 16, C.I. Reactive Yellow 17, C.I. Reactive Yellow 18, C.I. Reactive Yellow 22, C.I. Reactive Yellow 23, C.I. Reactive Yellow 24, C.I. Reactive Yellow 25, C.I. Reactive Yellow 26, C.I. Reactive Yellow 27, C.I. Reactive Yellow 37, and C.I. Reactive Yellow 42; C.I. Food Yellow 3 and C.I. Food Yellow 4; C.I. Solvent Yellow 15, C.I. Solvent Yellow 19, C.I. Solvent Yellow 21, C.I. Solvent Yellow 30, and C.I. Solvent Yellow 109; and C.I. Pigment Yellow 1, C.I. Pig- ment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185. Colorants other than yellow colo- rants usable in the dark yellow ink composition according to the present invention may be properly selected, for example, from dyes and pigments having other hues described below, more specifically magenta colorants, cyan colorants, and black colorants described below.

According to a further preferred embodiment of the present invention, the dark yellow ink composition contains, as colorants, at least a first colorant and a second colorant which is a colorant other than yellow. Here the first colorant refers to a yellow colorant which can develop the so-called "yellow color."

When a dye is used as the colorant in the dark yellow ink composition, a specific preferred example of the first colorant is at least one dye selected from the group consisting of compounds represented by formulae (I) and (II)

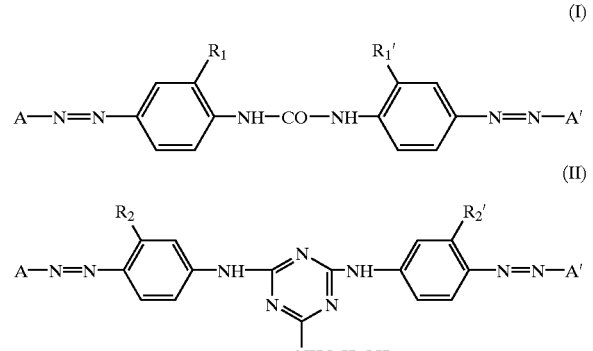

wherein $R_1$, $R_1'$, $R_2$, and $R_2'$ each independently represent $CH_3$ or $OCH_3$; and A and A' each independently represent a group having a structure selected from the group consisting of

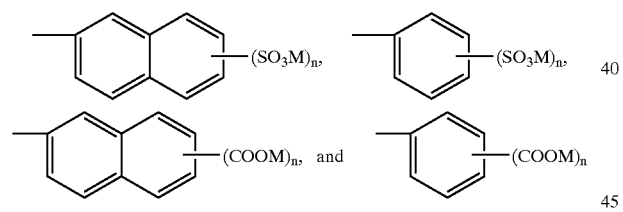

wherein

M represents hydrogen, lithium, sodium, potassium, ammonium, or an organic amine; and n is an integer of 1 or 2.

More preferably, the first colorant is a dye selected from the group consisting of C.I. Direct Yellow 50, C.I. Direct Yellow 55, C.I. Direct Yellow 86, C.I. Direct Yellow 132, and C.I. Direct Yellow 173.

When a dye is used as the colorant, the second colorant is preferably at least one dye selected from the group consisting of magenta dyes, cyan dyes, and black dyes.

Here the magenta dye usable as the second colorant may be any magenta dye so far as a magenta color can be rendered. Preferably, the magenta dye as the second colorant is selected from compounds represented by formula (III)

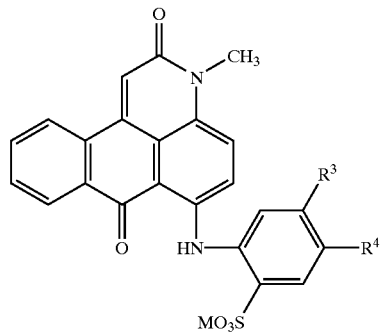

wherein

M represents hydrogen, lithium, sodium, potassium, ammonium, or an organic amine, and $R^3$ represents chlorine or a group represented by formula

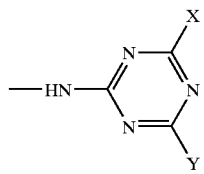

wherein

X represents an anilino group substituted by at least one $SO_3M$, and

Y represents OH, chlorine, or a morpholino group, $R^4$ represents hydrogen, chlorine, $SO_3M$, or a $C_1$–$C_4$ alkyl group, or compounds represented by formula (IV)

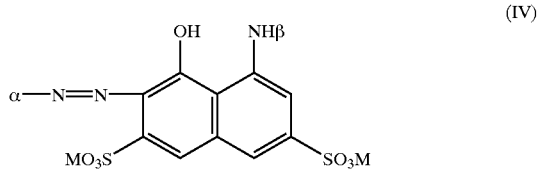

wherein

α represents a $C_1$–$C_4$ alkyl or alkoxy group or an OH—, $SO_3H$—, or COOM-substituted phenyl or naphthyl group, β represents hydrogen or a group represented by formula

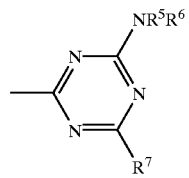

wherein $R^5$ represents hydrogen or an OH— or COOH-substituted $C_1$–$C_4$ alkyl group, $R^6$ represents an OH—, $OCH_3$—, $OC_2H_5$—, $SO_3M$—, or COOM-substituted $C_1$–$C_4$ alkyl or phenyl group, $R^7$ represents OH, COOH, or $NHR^8$, and $R^8$ represents an $SO_3M$— or COOH-substituted $C_1$–$C_4$ alkyl group, M represents hydrogen, lithium, sodium, potassium, ammonium, or an organic amine.

A single compound may be selected, as the magenta dye usable as the second colorant, from the group consisting of compounds represented by formulae (III) and (IV), or alternatively, a plurality of compounds may be selected from the group consisting of compounds represented by formulae (III) and (IV), and may be used as a mixture thereof.

The following compounds may be mentioned as specific examples of compounds represented by formula (III).

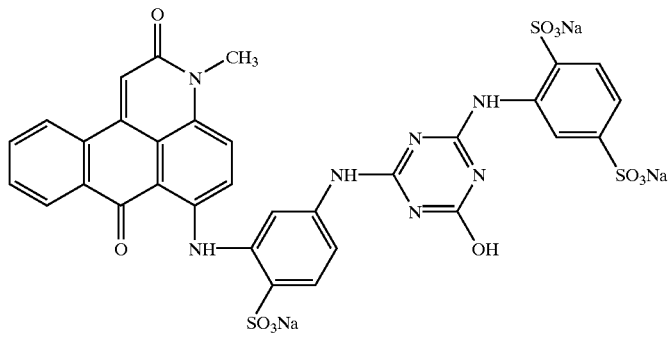

M-1

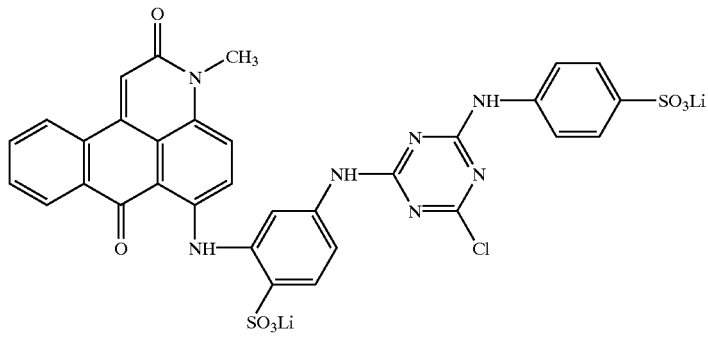

M-2

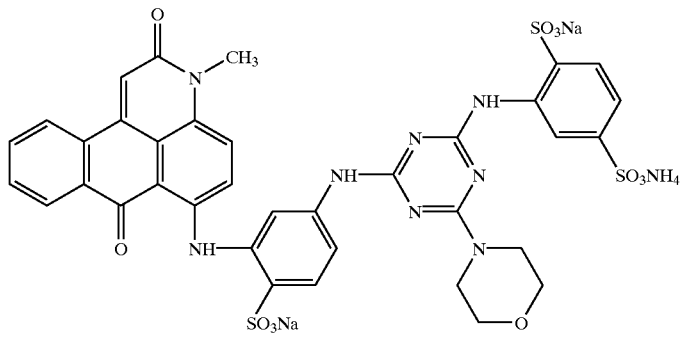

M-3

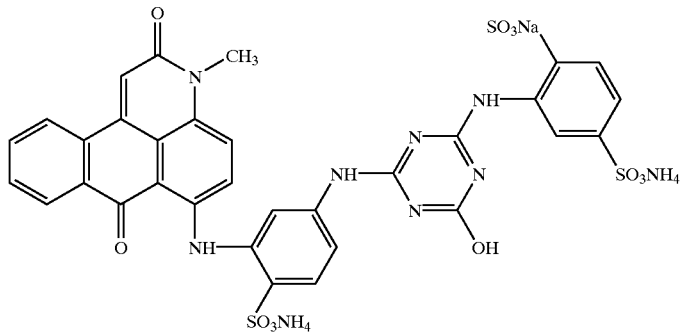

M-4

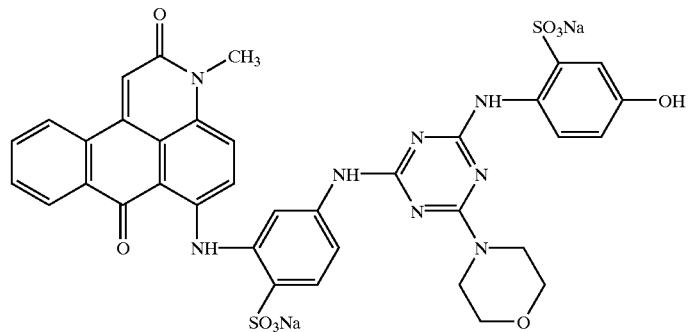
M-5
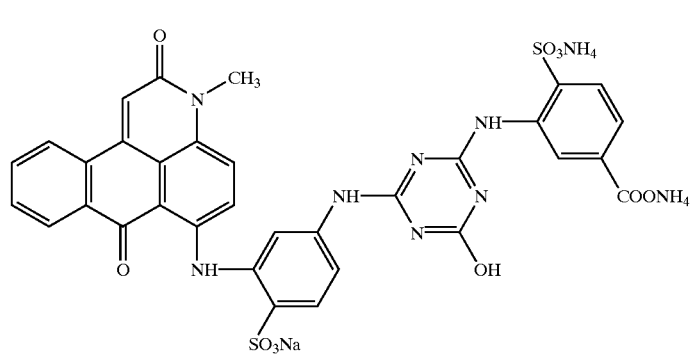
M-6
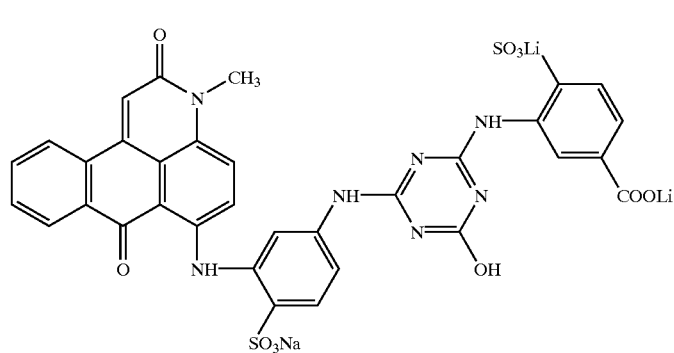
M-7
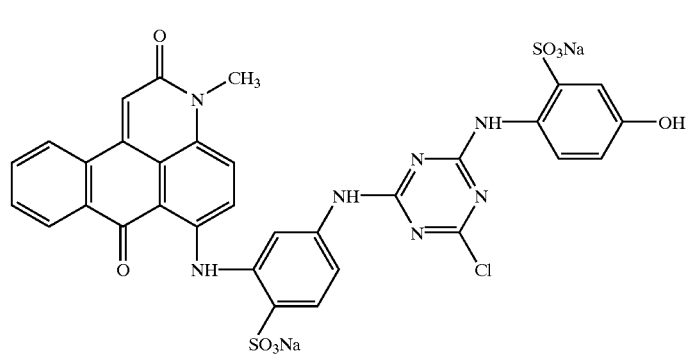
M-8

M-9
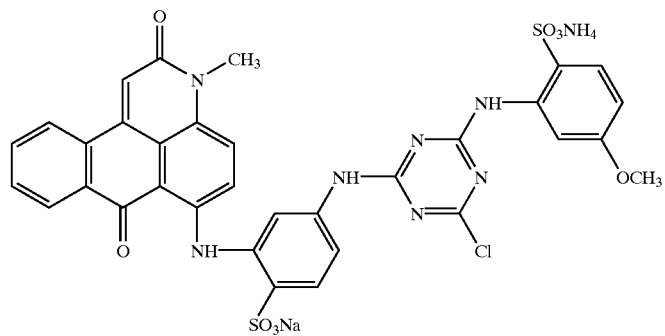
M-10
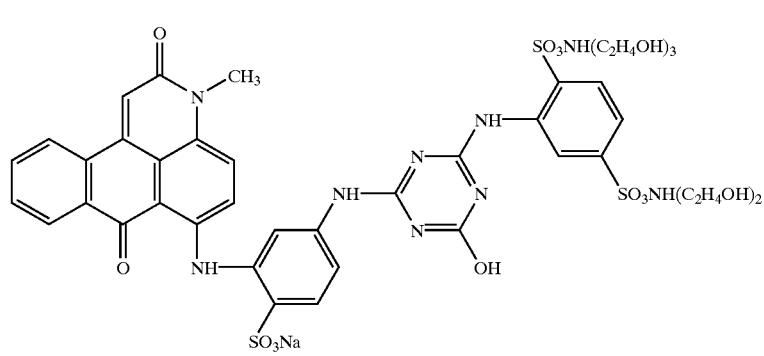
M-11
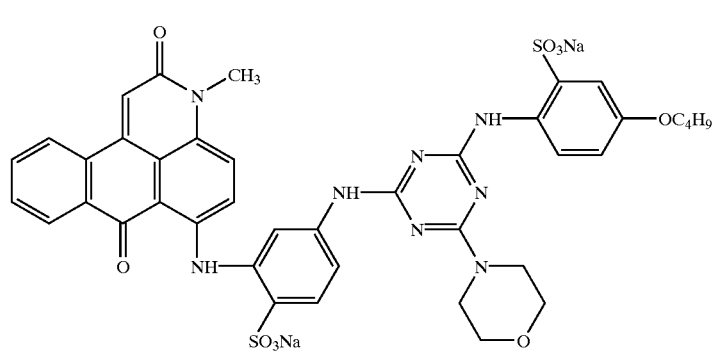
M-12
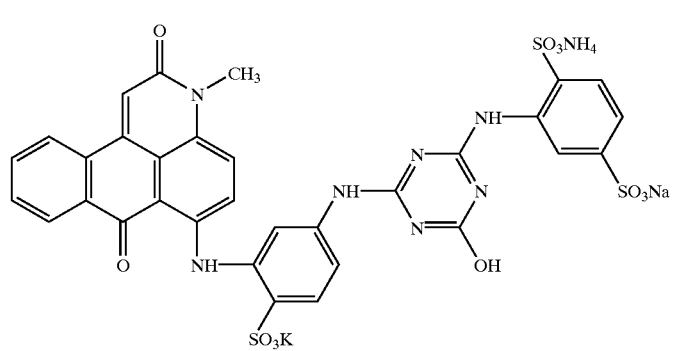

The following compounds may be mentioned as specific examples of compounds represented by formula (IV).
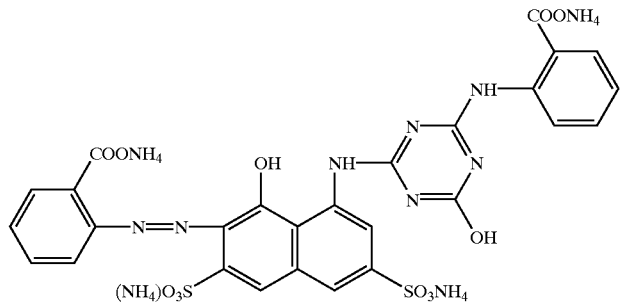
M-13
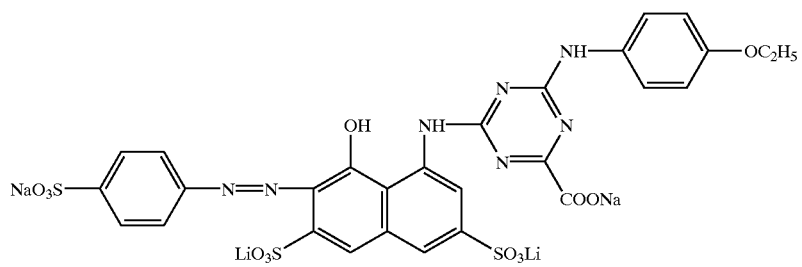
M-14
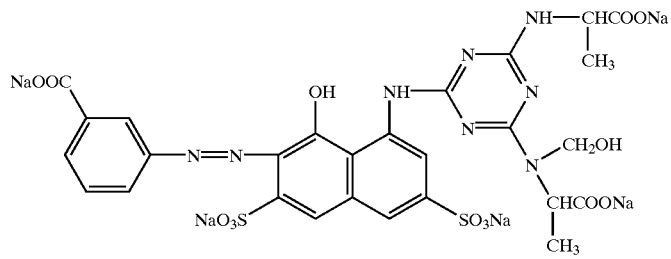
M-15
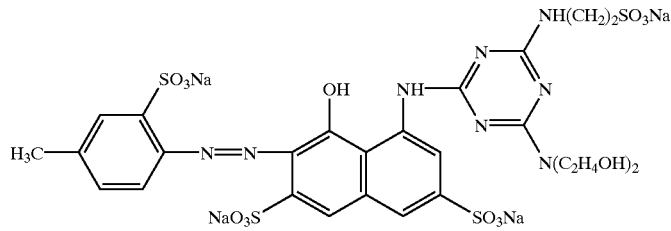
M-16
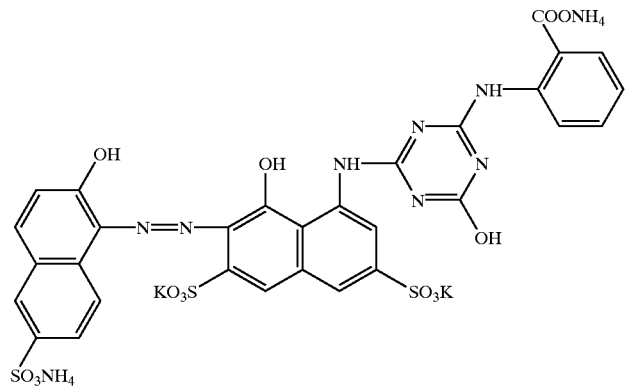
M-17

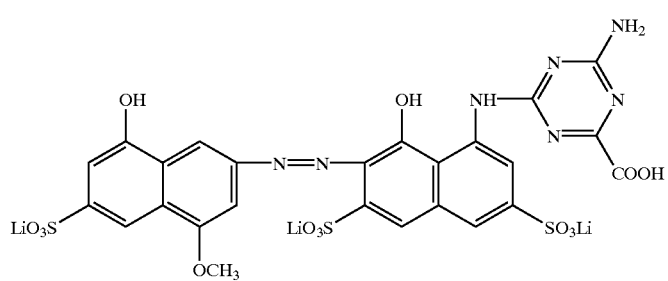
M-18
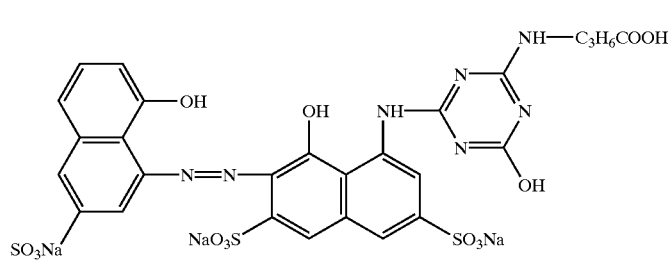
M-19
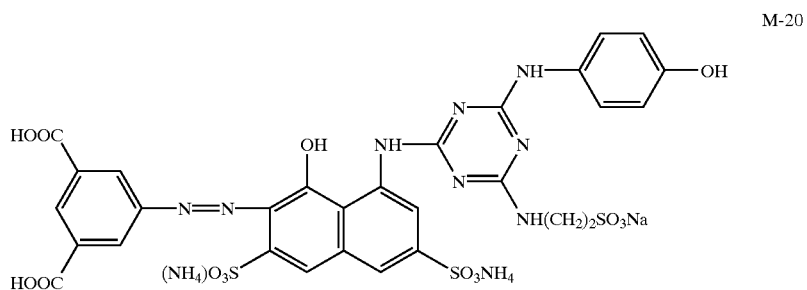
M-20
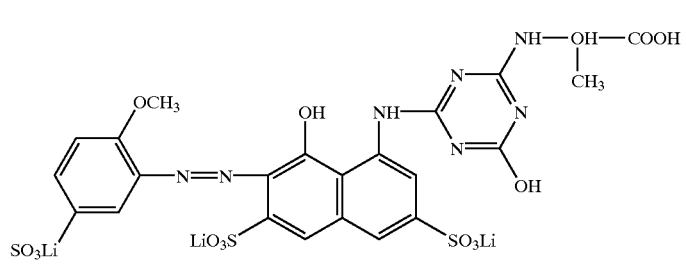
M-21
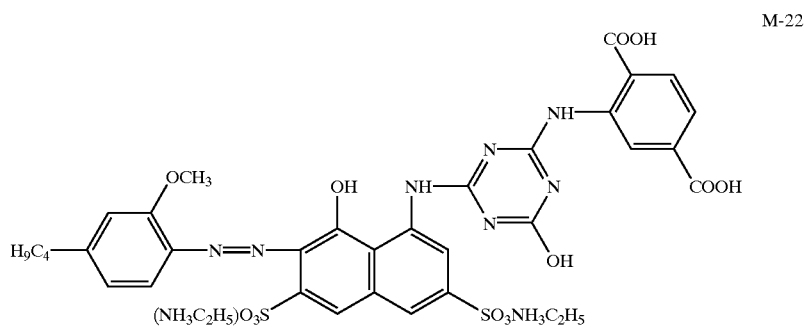
M-22

The cyan dye used as the second colorant may be any cyan dye so far as a cyan color can be rendered. The cyan dye is preferably selected from compounds represented by formula (V)

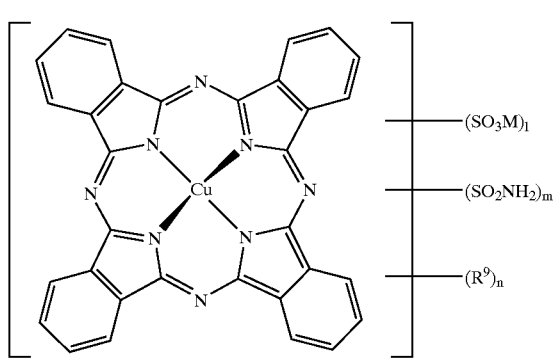

(V)

wherein

R$^9$ represents OH, COOM, or R$^{10}$COOM wherein R$^{10}$ represents C$_4$–C$_9$ alkyl group, and l, m, and n are each 0 to 4, provided that (l+m+n)=4.

A single compound may be selected as the cyan dye from a group of compounds represented by formula (V), or alternatively, a plurality of compounds may be selected from a group of compounds represented by formula (V), and may be used as a mixture thereof.

Specific examples of compounds represented by formula (V) include C.I. Direct Blue 86, C.I. Direct Blue 87, and C.I. Direct Blue 199.

The black dye used as the second colorant may be any black dye so far as a black color can be rendered. Preferred examples of black dyes include C.I. Direct Black 195, C.I. Food Black 2, C.I. Sulfur Black 1, C.I. Reactive Black 31, and C.I. Reactive Black 35. A single black dye may be selected from the above group of black dyes, or alternatively, a plurality of black dyes may be selected from the above group of black dyes and may be used as a mixture thereof.

Thus, limiting the colorant in the dark yellow ink composition to a specific dye can realize prints possessing excellent image fastness properties, such as excellent fastness to light, fastness to gas, fastness to moisture, and fastness to water. This ink composition is also advantageous, for example, from the viewpoints of anti-clogging properties and storage stability of ink.

In addition to the specific first and second colorants, an additional dye may be used in the dye as the colorant in the dark yellow ink composition. This additional dye may be properly selected from conventional dyes.

According to a further preferred embodiment of the present invention, when a pigment is used as the colorant in the dark yellow ink composition, a specific preferred example of the first colorant may be at least one pigment selected from the group consisting of C.I. Pigment Yellow 74, C.I. Pigment Yellow 93, C.I. Pigment Yellow 109, C.I. Pigment Yellow 110, C.I. Pigment Yellow 128, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185. More preferred are C.I. Pigment Yellow 74, C.I. Pigment Yellow 109, C.I. Pigment Yellow 110, C.I. Pigment Yellow 128, and C.I. Pigment Yellow 154.

When a pigment is used as the colorant, a specific example of the second colorant is at least one pigment selected from the group consisting of: C.I. Pigment Blue 15:3, C.I. Pigment Blue 15:4, and C.I. Pigment Blue 60 as cyan colorants; C.I. Pigment Red 122, C.I. Pigment Red 202, and C.I. Pigment Red 209 as magenta colorants; C.I. Pigment Violet 19; and carbon black as a black colorant. The second colorant is more preferably at least one pigment selected from the group consisting of C.I. Pigment Blue 15:3, C.I. Pigment Red 122, and carbon black.

Thus, limiting the colorant in the dark yellow ink composition to a specific pigment can realize the formation of prints possessing excellent image fastness properties, such as excellent fastness to light and fastness to gas, and, at the same time, better color reproduction range. This ink composition is also advantageous, for example, from the viewpoints of excellent anti-clogging properties and storage stability of ink.

In addition to the specific first and second colorants, a further pigment may be used in the pigment as the colorant in the dark yellow ink composition. This further colorant may be properly selected, for example, from a group of pigments described below.

When the colorant in the dark yellow ink composition is a pigment, the amount of the first colorant added is preferably 0.1 to 10% by weight, more preferably 0.2 to 8% by weight, based on the dark yellow ink composition. The amount of the second colorant added is preferably 0.1 to 10% by weight, more preferably 0.2 to 8% by weight, based on the dark yellow ink composition. The addition of the first colorant and the second colorant in the above respective amounts to the dark yellow ink composition is also advantageous, for example, from the viewpoints of reliability, such as anti-clogging properties, storage stability, and ejection stability, and print quality, such as color development and color reproduction range.

Water, Water-soluble Organic Solvent, and Other Optional Ingredients

According to the present invention, water or a mixed solution composed of water and a water-soluble organic solvent is suitable as a main solvent for the dark yellow ink composition.

Water may be pure water obtained by ion exchange, ultrafiltration, reverse osmosis, distillation or the like, or ultrapure water. Further, water, which has been sterilized, for example, by ultraviolet irradiation or by addition of hydrogen peroxide, is suitable because, when the ink composition is stored for a long period of time, it can prevent the growth of mold or bacteria.

Water-soluble organic solvents include, for example, high-boiling organic solvents. High-boiling organic solvents can prevent the ink composition from drying and thus can prevent clogging of the head. Preferred examples of high-boiling organic solvents include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone and N-methyl-2-pyrrolidone; 1,3-di-methyl-2-imidazolidinone; and triethanolamine. The amount of the high-boiling organic solvent added is not particularly limited. The amount of the high-boiling organic solvent added, however, is preferably about 2 to 50% by weight, more preferably about 5 to 40% by weight, based on the ink composition.

According to one preferred embodiment of the present invention, the dark yellow ink composition may further contain a penetrating agent. Preferred examples of penetrating agents include alkyl ethers of polyhydric alcohols, for example, ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol monomethyl ether, dipropylene glycol monoethyl ether, dipropylene glycol mono-n-propyl ether, and dipropylene glycol mono-iso-propyl ether.

According to another preferred embodiment of the present invention, the dark yellow ink composition may further contain a surfactant from the viewpoints of accelerated penetration, reliable ejection, and the production of good images. Examples of surfactants include: anionic surfactants, for example, sodium dodecylbenzenesulfonate, sodium laurylate, and an ammonium salt of polyoxyethylene alkyl ether sulfates; nonionic surfactants, for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides; and acetylene glycol surfactants. They may be used alone or in combination of two or more.

Specific examples of preferred acetylene glycol surfactants usable in the present invention include compounds represented by formula (a):

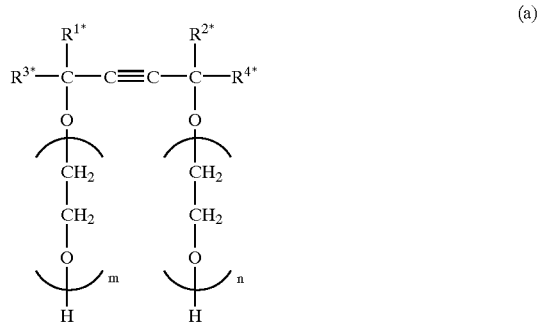

wherein $0 \leq m+n \leq 50$; and $R^{1*}$, $R^{2*}$, $R^{3*}$, and $R^{4*}$ each independently represent an alkyl group, preferably an alkyl group having 1 to 6 carbon atoms.

Among the compounds represented by this formula (a), particularly preferred compounds include 2,4,7,9-tetramethyl-5-decyne-4,7-diol, 3,6-dimethyl-4-octyne-3,6-diol, and 3,5-dimethyl-1-hexyn-3-ol. Commercially available products may also be used as the acetylene glycol surfactants represented by formula (a). Specific examples thereof include Surfynol 82, Surfynol 104, Surfynol 440, Surfynol 465, Surfynol 485, and Surfynol TG (all the above products being available from Air Products and Chemicals Inc.) and OLFINE STG and OLFINE E 1010 (tradenames; manufactured by Nissin Chemical Industry Co., Ltd.).

The amount of the surfactant added may be preferably in the range of about 0.1 to 5% by weight, more preferably in the range of about 0.2 to 3% by weight, based on the ink composition. In the present invention, the surface tension of the dark yellow ink composition is preferably about 15 to 50 mN/m, more preferably about 25 to 40 mN/m.

The dark yellow ink composition according to the present invention may further contain nozzle clogging preventives, preservatives, antioxidants, electric conductivity adjustors, pH adjustors, solubilizers, viscosity modifiers, oxygen absorbers, etc.

Examples of preservatives include sodium benzoate, pentachlorophenol sodium, 2-pyridinethiol-1-oxide sodium, sodium sorbate, sodium dehydroacetate, and 1,2-dibenzothiazolin-3-one (Proxel CRL, Proxel BDN, Proxel GXL, Proxel XL-2, and Proxel TN, manufactured by Avecia).

Examples of pH adjustors, solubilizers, or antioxidants include: amines, such as diethanolamine, triethanolamine, propanolamine, and morpholine, and modification products thereof; inorganic salts, such as potassium hydroxide, sodium hydroxide, and lithium hydroxide; ammonium hydroxide; quaternary ammonium hydroxide, such as tetramethylammonium; salts of carbonic acid, such as potassium carbonate, sodium carbonate, and lithium carbonate; salts of phosphoric acid, such as potassium phosphate, sodium phosphate, and lithium phosphate; N-methyl-2-pyrrolidone; urea compounds, such as urea, thiourea, and tetramethylurea; allophanates, such as allophanate and methyl allophanate; biurets, such as biuret, dimethylbiuret, and tetramethylbiuret; and L-ascorbic acid and salts thereof.

According to the present invention, the above-described other optional ingredients may be used solely or as a mixture of a plurality of optional ingredients selected from a single group or a plurality of groups of the optional ingredients.

In the present invention, the amounts of all the ingredients of the dark yellow ink composition are preferably selected so that the viscosity of the ink composition is not more than 10 mpa.s at 20° C.

Other Ink Compositions

According to a preferred embodiment of the present invention, the ink set further comprises a normal yellow ink composition and a dark yellow ink composition and, in addition, a magenta ink composition and a cyan ink composition.

According to another preferred embodiment of the present invention, the ink set further comprises a normal yellow ink composition and a dark yellow ink composition and, in addition, two magenta ink compositions different from each other in color density and two cyan ink compositions different from each other in color density. Here the two magenta ink compositions different from each other in color density are constituted by a magenta ink composition having higher color density (hereinafter often referred to simply as "magenta ink composition") and a magenta ink composition having lower color density (hereinafter often referred to as "light magenta ink composition"). The two cyan ink compositions different from each other in color density are constituted by a cyan ink composition having higher color density (hereinafter often referred to simply as "cyan ink composition") and a cyan ink composition having lower color density (hereinafter often referred to as "light cyan ink composition"). The light magenta ink composition and the light cyan ink composition may be prepared by properly selecting a colorant and other ingredients and properly varying the mixing ratio of them to lower the color density.

According to a further preferred embodiment of the present invention, the ink set further contains a black ink composition. Further, if necessary, the ink set according to the present invention may further contain an orange ink composition and/or a green ink composition.

In the present invention, the colorant in the normal yellow ink composition may be any colorant so far as a yellow color can be rendered, and, in this case, the colorant may be a dye or a pigment. Therefore, any of dyes or pigments exemplified above in connection with the dark yellow ink composition may be used. In the normal yellow ink composition, a yellow colorant is preferred as the colorant, and may be properly selected, for example, from yellow colorants exemplified above in connection with the dark yellow ink composition. Ingredients other than the colorant in the normal yellow ink composition are not particularly limited, and may be those commonly used in the art. Preferably, however, ingredients other than the colorant in the normal yellow ink composition are properly selected from ingredients constituting the dark yellow ink composition.

In the present invention, the colorant contained in the magenta ink composition may be any colorant so far as a magenta color can be rendered. Likewise, the colorant contained in the cyan ink composition may be any colorant so far as a cyan color can be rendered. Further, the colorant contained in the black ink composition may be any colorant so far as a black color can be rendered. That is, in these ink compositions, as with the dark yellow ink composition, the colorant may be a dye or a pigment.

In the magenta ink composition, a magenta colorant may be preferably used as the colorant, and specific examples of magenta colorants usable herein include: C.I. Acid Red 1, C.I. Acid Red 6, C.I. Acid Red 8, C.I. Acid Red 9, C.I. Acid Red 13, C.I. Acid Red 14, C.I. Acid Red 18, C.I. Acid Red 26, C.I. Acid Red 27, C.I. Acid Red 32, C.I. Acid Red 35, C.I. Acid Red 37, C.I. Acid Red 42, C.I. Acid Red 51, C.I. Acid Red 52, C.I. Acid Red 57, C.I. Acid Red 75, C.I. Acid Red 77, C.I. Acid Red 80, C.I. Acid Red 82, C.I. Acid Red 85, C.I. Acid Red 87, C.I. Acid Red 88, C.I. Acid Red 89, C.I. Acid Red 92, C.I. Acid Red 94, C.I. Acid Red 97, C.I. Acid Red 106, C.I. Acid Red 111, C.I. Acid Red 114, C.I. Acid Red 115, C.I. Acid Red 117, C.I. Acid Red 118, C.I. Acid Red 119, C.I. Acid Red 129, C.I. Acid Red 130, C.I. Acid Red 131, C.I. Acid Red 133, C.I. Acid Red 134, C.I. Acid Red 138, C.I. Acid Red 143, C.I. Acid Red 145, C.I. Acid Red 154, C.I. Acid Red 155, C.I. Acid Red 158, C.I. Acid Red 168, C.I. Acid Red 180, C.I. Acid Red 183, C.I. Acid Red 184, C.I. Acid Red 186, C.I. Acid Red 194, C.I. Acid Red 198, C.I. Acid Red 209, C.I. Acid Red 211, C.I. Acid Red 215, C.I. Acid Red 219, C.I. Acid Red 249, C.I. Acid Red 252, C.I. Acid Red 254, C.I. Acid Red 262, C.I. Acid Red 265, C.I. Acid Red 274, C.I. Acid Red 282, C.I. Acid Red 289, C.I. Acid Red 303, C.I. Acid Red 317, C.I. Acid Red 320, C.I. Acid Red 321, and C.I. Acid Red 322; C.I. Direct Red 1, C.I. Direct Red 2, C.I. Direct Red 4, C.I. Direct Red 9, C.I. Direct Red 11, C.I. Direct Red 13, C.I. Direct Red 17, C.I. Direct Red 20, C.I. Direct Red 23, C.I. Direct Red 24, C.I. Direct Red 28, C.I. Direct Red 31, C.I. Direct Red 33, C.I. Direct Red 37, C.I. Direct Red 39, C.I. Direct Red 44, C.I. Direct Red 46, C.I. Direct Red 62, C.I. Direct Red 63, C.I. Direct Red 75, C.I. Direct Red 79, C.I. Direct Red 80, C.I. Direct Red 81, C.I. Direct Red 83, C.I. Direct Red 84, C.I. Direct Red 89, C.I. Direct Red 95, C.I. Direct Red 99, C.I. Direct Red 113, C.I. Direct Red 197, C.I. Direct Red 201, C.I. Direct Red 218, C.I. Direct Red 220, C.I. Direct Red 224, C.I. Direct Red 225, C.I. Direct Red 226, C.I. Direct Red 227, C.I. Direct Red 228, C.I. Direct Red 229, C.I. Direct Red 230, and C.I. Direct Red 231; C.I. Reactive Red 1, C.I. Reactive Red 2, C.I. Reactive Red 3, C.I. Reactive Red 4, C.I. Reactive Red 5, C.I. Reactive Red 6, C.I. Reactive Red 7, C.I. Reactive Red 8, C.I. Reactive Red 11, C.I. Reactive Red 12, C.I. Reactive Red 13, C.I. Reactive Red 15, C.I. Reactive Red 16, C.I. Reactive Red 17, C.I. Reactive Red 19, C.I. Reactive Red 20, C.I. Reactive Red 21, C.I. Reactive Red 22, C.I. Reactive Red 23, C.I. Reactive Red 24, C.I. Reactive Red 28, C.I. Reactive Red 29, C.I. Reactive Red 31, C.I. Reactive Red 32, C.I. Reactive Red 33, C.I. Reactive Red 34, C.I. Reactive Red 35, C.I. Reactive Red 36, C.I. Reactive Red 37, C.I. Reactive Red 38, C.I. Reactive Red 39, C.I. Reactive Red 40, C.I. Reactive Red 41, C.I. Reactive Red 42, C.I. Reactive Red 43, C.I. Reactive Red 45, C.I. Reactive Red 46, C.I. Reactive Red 49, C.I. Reactive Red 50, C.I. Reactive Red 58, C.I. Reactive Red 59, C.I. Reactive Red 63, and C.I. Reactive Red 64; C.I. Solubilized Red 1; C.I. Food Red 7, C.I. Food Red 9, and C.I. Food Red 14; and C.I. Pigment Red 5, C.I. Pigment Red 7, C.I. Pigment Red 12, C.I. Pigment Red 41, C.I. Pigment Red 48, C.I. Pigment Red 48 (Ca), C.I. Pigment Red 48 (Mn), C.I. Pigment Red 54, C.I. Pigment Red 57, C.I. Pigment Red 57 (Ca), C.I. Pigment Red 57:1, C.I. Pigment Red 58, C.I. Pigment Red 63, C.I. Pigment Red 68, C.I. Pigment Red 81, C.I. Pigment Red 112, C.I. Pigment Red 122, C.I. Pigment Red 123, C.I. Pigment Red 168, C.I. Pigment Red 184, and C.I. Pigment Red 202.

In the cyan ink composition, a cyan colorant may be preferably used as the colorant, and specific examples of cyan colorants include: C.I. Acid Blue 1, C.I. Acid Blue 7, C.I. Acid Blue 9, C.I. Acid Blue 15, C.I. Acid Blue 22, C.I. Acid Blue 23, C.I. Acid Blue 25, C.I. Acid Blue 27, C.I. Acid Blue 29, C.I. Acid Blue 40, C.I. Acid Blue 41, C.I. Acid Blue 43, C.I. Acid Blue 45, C.I. Acid Blue 54, C.I. Acid Blue 59, C.I. Acid Blue 60, C.I. Acid Blue 62, C.I. Acid Blue 72, C.I. Acid Blue 74, C.I. Acid Blue 78, C.I. Acid Blue 80, C.I. Acid Blue 82, C.I. Acid Blue 83, C.I. Acid Blue 90, C.I. Acid Blue 92, C.I. Acid Blue 93, C.I. Acid Blue 100, C.I. Acid Blue 102, C.I. Acid Blue 103, C.I. Acid Blue 104, C.I. Acid Blue 112, C.I. Acid Blue 113, C.I. Acid Blue 117, C.I. Acid Blue 120, C.I. Acid Blue 126, C.I. Acid Blue 127, C.I. Acid Blue 129, C.I. Acid Blue 130, C.I. Acid Blue 131, C.I. Acid Blue 138, C.I. Acid Blue 140, C.I. Acid Blue 142, C.I. Acid Blue 143, C.I. Acid Blue 151, C.I. Acid Blue 154, C.I. Acid Blue 158, C.I. Acid Blue 161, C.I. Acid Blue 166, C.I. Acid Blue 167, C.I. Acid Blue 168, C.I. Acid Blue 170, C.I. Acid Blue 171, C.I. Acid Blue 182, C.I. Acid Blue 183, C.I. Acid Blue 184, C.I. Acid Blue 187, C.I. Acid Blue 192, C.I. Acid Blue 199, C.I. Acid Blue 203, C.I. Acid Blue 204, C.I. Acid Blue 205, C.I. Acid Blue 229, C.I. Acid Blue 234, C.I. Acid Blue 236, and C.I. Acid Blue 249; C.I. Direct Blue 1, C.I. Direct Blue 2, C.I. Direct Blue 6, C.I. Direct Blue 15, C.I. Direct Blue 22, C.I. Direct Blue 25, C.I. Direct Blue 41, C.I. Direct Blue 71, C.I. Direct Blue 76, C.I. Direct Blue 77, C.I. Direct Blue 78, C.I. Direct Blue 80, C.I. Direct Blue 86, C.I. Direct Blue 87, C.I. Direct Blue 90, C.I. Direct Blue 98, C.I. Direct Blue 106, C.I. Direct Blue 108, C.I. Direct Blue 120, C.I. Direct Blue 123, C.I. Direct Blue 158, C.I. Direct Blue 160, C.I. Direct Blue 163, C.I. Direct Blue 165, C.I. Direct Blue 168, C.I. Direct Blue 192, C.I. Direct Blue 193, C.I. Direct Blue 194, C.I. Direct Blue 195, C.I. Direct Blue 196, C.I. Direct Blue 199, C.I. Direct Blue 200, C.I. Direct Blue 201, C.I. Direct Blue 202, C.I. Direct Blue 203, C.I. Direct Blue 207, C.I. Direct Blue 225, C.I. Direct Blue 226, C.I. Direct Blue 236, C.I. Direct Blue 237, C.I. Direct Blue 246, C.I. Direct Blue 248, and C.I. Direct Blue 249; C.I. Reactive Blue 1, C.I. Reactive Blue 2, C.I. Reactive Blue 3, C.I. Reactive Blue 4, C.I. Reactive Blue 5, C.I. Reactive Blue 7, C.I. Reactive Blue 8, C.I. Reactive Blue 9, C.I. Reactive Blue 13, C.I. Reactive Blue 14, C.I. Reactive Blue 15, C.I.

Reactive Blue 17, C.I. Reactive Blue 18, C.I. Reactive Blue 19, C.I. Reactive Blue 20, C.I. Reactive Blue 21, C.I. Reactive Blue 25, C.I. Reactive Blue 26, C.I. Reactive Blue 27, C.I. Reactive Blue 28, C.I. Reactive Blue 29, C.I. Reactive Blue 31, C.I. Reactive Blue 32, C.I. Reactive Blue 33, C.I. Reactive Blue 34, C.I. Reactive Blue 37, C.I. Reactive Blue 38, C.I. Reactive Blue 39, C.I. Reactive Blue 40, C.I. Reactive Blue 41, C.I. Reactive Blue 43, C.I. Reactive Blue 44, and C.I. Reactive Blue 46; C.I. Solubilized Vat Blue 1, C.I. Solubilized Vat Blue 5, and C.I. Solubilized Vat Blue 41; C.I. Vat Blue 4, C.I. Vat Blue 29, and C.I. Vat Blue 60; C.I. Food Blue 1 and C.I. Food Blue 2; C.I. Basic Blue 9, C.I. Basic Blue 25, C.I. Basic Blue 28, C.I. Basic Blue 29, and C.I. Basic Blue 44; and C.I. Pigment Blue 1, C.I. Pigment Blue 2, C.I. Pigment Blue 3, C.I. Pigment Blue 15:3, C.I. Pigment Blue 15:34, C.I. Pigment Blue 15:4, C.I. Pigment Blue 16, C.I. Pigment Blue 17, C.I. Pigment Blue 22, and C.I. Pigment Blue 60.

In the black ink composition, a black colorant may be preferably used as the colorant, and specific examples of black colorants usable herein include: C.I. Acid Black 1, C.I. Acid Black 2, C.I. Acid Black 7, C.I. Acid Black 24, C.I. Acid Black 26, C.I. Acid Black 29, C.I. Acid Black 31, C.I. Acid Black 48, C.I. Acid Black 50, C.I. Acid Black 51, C.I. Acid Black 52, C.I. Acid Black 58, C.I. Acid Black 60, C.I. Acid Black 62, C.I. Acid Black 63, C.I. Acid Black 64, C.I. Acid Black 67, C.I. Acid Black 72, C.I. Acid Black 76, C.I. Acid Black 77, C.I. Acid Black 94, C.I. Acid Black 107, C.I. Acid Black 108, C.I. Acid Black 109, C.I. Acid Black 110, C.I. Acid Black 112, C.I. Acid Black 115, C.I. Acid Black 118, C.I. Acid Black 119, C.I. Acid Black 121, C.I. Acid Black 122, C.I. Acid Black 131, C.I. Acid Black 132, C.I. Acid Black 139, C.I. Acid Black 140, C.I. Acid Black 155, C.I. Acid Black 156, C.I. Acid Black 157, C.I. Acid Black 158, C.I. Acid Black 159, and C.I. Acid Black 191; C.I. Direct Black 17, C.I. Direct Black 19, C.I. Direct Black 22, C.I. Direct Black 32, C.I. Direct Black 38, C.I. Direct Black 51, C.I. Direct Black 56, C.I. Direct Black 62, C.I. Direct Black 71, C.I. Direct Black 74, C.I. Direct Black 75, C.I. Direct Black 77, C.I. Direct Black 94, C.I. Direct Black 105, C.I. Direct Black 106, C.I. Direct Black 107, C.I. Direct Black 108, C.I. Direct Black 112, C.I. Direct Black 113, C.I. Direct Black 117, C.I. Direct Black 118, C.I. Direct Black 132, C.I. Direct Black 133, C.I. Direct Black 146, C.I. Direct Black 154, and C.I. Direct Black 168; C.I. Reactive Black 1, C.I. Reactive Black 3, C.I. Reactive Black 4, C.I. Reactive Black 5, C.I. Reactive Black 6, C.I. Reactive Black 8, C.I. Reactive Black 9, C.I. Reactive Black 10, C.I. Reactive Black 12, C.I. Reactive Black 13, C.I. Reactive Black 14, and C.I. Reactive Black 18; C.I. Solubilized Vat Black 1; and C.I. Food Black 2. Further examples of black colorants include: pigments manufactured by Mitsubishi Chemical Corporation, for example, No. 2300, No. 900, MCF 88, No. 33, No. 40, No. 45, No. 52, MA 7, MA 8, MA 100, and No. 2200 B; pigments manufactured by Columbian Carbon Co., Ltd., for example, Raven 5750, Raven 5250, Raven 5000, Raven 3500, Raven 1255, and Raven 700; pigments manufactured by Cabot Corporation, for example, Regal 400 R, Regal 330 R, Regal 660 R, Mogul L, Monarch 700, Monarch 800, Monarch 880, Monarch 900, Monarch 1000, Monarch 1100, Monarch 1300, and Monarch 1400; and pigments manufactured by Degussa, for example, Color Black FW 1, Color Black FW 2, Color Black FW 2 V, Color Black FW 18, Color Black FW 200, Color Black S 150, Color Black S 160, Color Black S 170, Printex 35, Printex U, Printex V, Printex 140 U, Special Black 6, Special Black 5, Special Black 4A, and Special Black 4.

In these magenta ink composition, cyan ink composition, and black ink composition, ingredients other than the colorants are not particularly limited, and may be those commonly used in the art. Preferably, however, ingredients other than the colorants are properly selected from ingredients constituting the dark yellow ink composition.

Recording Method

The ink set according to the present invention may be used in image recording methods using ink compositions contained in the ink set. Recording methods using the ink compositions include, for example, an ink jet recording method, screen printing, a recording method using writing utensils, such as pens, and other various printing methods. According to the present invention, there is provided a recording system wherein the ink composition contained in the ink set is deposited onto a recording medium to perform printing, particularly an ink jet recording method wherein droplets of the ink composition contained in the ink set according to the present invention are ejected and deposited onto a recording medium to perform printing. The recording method using the ink set according to the present invention can realize the formation of images with a wide color reproduction range and good image reproduction.

Thus, in a preferred embodiment, the present invention provides a recording method comprising the step of depositing an ink composition onto a recording medium to perform printing, wherein the ink set according to the present invention is used.

In a further preferred embodiment, the present invention provides an ink jet recording method comprising the steps of: ejecting droplets of an ink composition; and depositing the droplets onto a recording medium to perform printing, wherein the above ink set is used.

Further, the present invention provides a record produced by any one of the above recording methods.

Ink Cartridge

In a preferred embodiment, the present invention provides an ink cartridge comprising at least an ink reservoir for storing a dark yellow ink composition contained in the ink set. A specific example of this ink cartridge is shown in FIG. 1B. This cartridge may be used alone or in combination with an ink cartridge for storing a normal yellow ink composition and/or other ink cartridges for storing other conventional ink compositions.

In one preferred embodiment, the present invention provides an ink cartridge comprising partitioned ink reservoirs which are independent of each other and respectively contain the ink compositions constituting the ink set. Specific examples of this cartridge include ink cartridges shown in FIGS. 1A and 1C to 1F. In the ink cartridge shown in FIG. 1A, an ink reservoir for storing a black ink composition may be additionally provided. That is, in this case, the ink cartridge comprises ink reservoirs respectively for storing ink compositions of seven colors. In this way, storing a plurality of color ink compositions separately from each other within a single ink cartridge is advantageous over the storage of ink compositions of respective colors in respective separate ink cartridges in that compact construction of the whole ink cartridge can be realized.

In the ink cartridge which can store ink compositions of a plurality of colors separately from each other in the single ink cartridge, the ink reservoirs for respective colors may have the same size. When the amount of ink used is expected to vary depending upon the color of ink, however, the size of the individual ink reservoirs may be properly varied.

For example, in printing color images, inks of various colors are consumed. On the other hand, in printing monochrome images such as documents, black ink is mainly consumed. Therefore, when the size of the ink reservoir for the black ink composition is made larger than the ink reservoirs for ink compositions used mainly in printing of color images, the inks contained in the ink cartridge can be substantially simultaneously used up. This can minimize the amount of inks which are wastefully discarded.

In another preferred embodiment, the present invention provides an ink cartridge set comprising a combination of a plurality of independent ink cartridges including: a dark yellow ink cartridge containing the dark yellow ink composition included in the above ink set; and a normal yellow ink cartridge containing the normal yellow ink composition included in the ink set.

In this way, the provision of ink compositions of respective colors in respective separate ink cartridges can eliminate the need to exchange the cartridges in such a state that a part of the ink of some color remains unused. That is, according to this embodiment, the ink cartridges for ink compositions of respective colors can be exchanged independently of each other when the ink has been used up. Therefore, wasteful discard of ink can be avoided. This can realize the use of ink cartridges with high efficiency.

According to a more preferred embodiment of the present invention, the ink cartridge set further comprises: a magenta ink cartridge containing a magenta ink composition; and a cyan ink cartridge containing a cyan ink composition.

According to another more preferred embodiment of the present invention, the ink cartridge set further comprises: a light magenta ink cartridge containing a magenta ink composition having lower color density out of two magenta ink compositions different from each other in color density; a magenta ink cartridge containing a magenta ink composition having higher color density out of the two magenta ink compositions different from each other in color density; a light cyan ink cartridge containing a cyan ink composition having lower color density out of two cyan ink compositions different from each other in color density; and a cyan ink cartridge containing a cyan ink composition having higher color density out of the two cyan ink compositions different from each other in color density.

According to a further preferred embodiment of the present invention, the ink cartridge set further comprises a black ink cartridge containing a black ink composition.

According to another preferred embodiment of the present invention, the ink cartridge set is such that at least two ink cartridges included in the ink cartridge set are attached to each other by physical means. Combining single-color ink cartridges and physically attaching these ink cartridges to each other are sometimes advantageous when importance is attached to handleability.

Here, in "attaching the ink cartridges to each other by physical means," the means is not particularly limited, and examples of the means include the case where structures, which are attachable to each other, are provided respectively in the ink cartridges, the case where a fastening tool, such as a bolt, is used for the attachment, and the case where an adhesive is used for the attachment. Further, here the term "attachment" embraces the state of attachment that can be brought to a detached state as the need arises.

Ink jet Recording Apparatus

In a preferred embodiment, the present invention provides an ink jet recording apparatus for ejecting droplets of an ink composition and depositing the droplets onto a recording medium to perform printing, said ink jet recording apparatus comprising: the above ink cartridge; a recording head for ejecting an ink composition contained in the ink cartridge; and means for supplying the ink composition from the ink cartridge to the recording head.

Further, in another preferred embodiment, the present invention provides an ink jet recording apparatus for ejecting droplets of an ink composition and depositing the droplets onto a recording medium to perform printing, said ink jet recording apparatus comprising: the above ink cartridge set; a recording head for ejecting ink compositions contained in the ink cartridges constituting the ink cartridge set; and means for supplying the ink compositions from the ink cartridges to the recording head.

The use of the ink jet recording apparatus according to the present invention can realize the formation of images with a wide range of color reproduction and good image reproduction.

EXAMPLES

The following examples further illustrate the present invention, but are not intended to limit the scope of the present invention.

Test A

Preparation of Ink Compositions

Ingredients shown in Table 1 below were mixed together according to formulations specified in Table 1. The mixtures were filtered under pressure through a membrane filter having a pore diameter of 8 μm to prepare dark yellow ink compositions A1 to A8.

Here the amount of each ingredient in ink was expressed in % by weight (wt %) of the ingredient based on the total weight of the ink composition.

TABLE 1

| | | Dark yellow ink composition (unit: wt %) | | | | | | | |
|---|---|---|---|---|---|---|---|---|---|
| | | A1 | A2 | A3 | A4 | A5 | A6 | A7 | A8 |
| Colorant | C.I. Acid Yellow 23 | 2.6 | | 3.9 | | | | | |
| | C.I. Acid Red 52 | 0.4 | | 1.2 | | | | | |
| | C.I. Acid Blue 9 | 0.4 | | 0.6 | | | | | |
| | C.I. Direct Yellow 132 | | 1.47 | | | 2.05 | 1.86 | 2.05 | 2.05 |
| | C.I. Direct Yellow 86 | | 0.93 | | | 0.59 | 0.53 | 0.59 | 0.59 |
| | C.I. Direct Black 195 | | 0.6 | | | | 0.24 | 0.24 | 0.6 |
| | C.I. Pigment Blue 15:3 | | | | 0.5 | | | | |
| | C.I. Pigment Yellow 128 | | | | 4 | | | | |
| | C.I. Pigment Red 122 | | | | 0.75 | | | | |
| | Magenta colorant represented by formula M-4 | | | | | | | 1 | 0.5 |
| | C.I. Direct Blue 199 | | | | | 0.8 | 0.4 | 0.4 | |

TABLE 1-continued

|  |  | Dark yellow ink composition (unit: wt %) | | | | | | | |
|---|---|---|---|---|---|---|---|---|---|
|  |  | A1 | A2 | A3 | A4 | A5 | A6 | A7 | A8 |
|  | Magenta colorant represented by formula M-13 |  |  |  |  | 0.6 | 0.5 |  |  |
| Water-soluble organic solvent etc. | Glycerin | 10 | 10 | 10 | 10 | 10 | 10 | 10 | 10 |
|  | Ethylene glycol |  |  |  | 2 |  |  |  |  |
|  | Diethylene glycol |  | 8 |  |  |  | 6 |  |  |
|  | Triethylene glycol | 8 |  | 7 |  | 5 |  | 7 | 8 |
|  | Triethylene glycol monobutyl ether | 10 | 10 | 10 | 5 | 10 | 10 | 10 |  |
|  | 2-Pyrrolidone |  |  |  | 2 |  |  |  |  |
|  | Olfine E1010 (available from Nissin Chemical Industry Co., Ltd.) |  | 2 | 2 | 1 |  | 2 | 2 | 2 |
|  | Olfine STG (available from Nissin Chemical Industry Co., Ltd.) | 2 |  |  |  | 2 |  |  |  |
| Dispersant | Styrene-acrylic acid copolymer |  |  |  | 1.8 |  |  |  |  |
| pH adjustor | Triethanolamine | 0.3 | 0.3 | 0.3 |  | 0.3 | 0.3 | 0.3 | 0.3 |
| Preservative | Proxel XL-2 (available from AVECIA) | 0.3 | 0.3 | 0.3 |  | 0.3 | 0.3 | 0.3 | 0.3 |
|  | Water | Balance | Balance | Balance | Balance | Balance | Balance | Balance | Balance |

Measurement of Characteristics of Ink Compositions

α) Characteristics Determined From Dilution of Ink Composition With Water

Spectral characteristics of a dilution of each ink composition with water were measured with a spectrophotometer U-3000 (manufactured by Hitachi, Ltd.). In the measurement, ion-exchanged water was added to 1 ml of ink to bring the total volume to 1000 ml. The dilution was then subjected to the measurement of spectral characteristics using a quartz cell with an optical path length of 1 cm in a transmission mode.

Further, $L^*$, $a^*$, and $b^*$ values of each ink composition were determined using a program for color analysis (a program for color analysis attached to U-3000) from the measured spectral characteristics, and, in addition, for each ink composition, the absolute value of $b^*/a^*$, i.e., $|b^*/a^*|$, was determined. Furthermore, a difference in $b^*$ value between each dark yellow ink composition and a normal yellow ink composition used with the dark yellow ink composition was also determined. Furthermore, a difference in lightness between each dark yellow ink composition and a normal yellow ink composition used with the dark yellow ink composition was also determined.

In the spectral characteristics obtained for each ink composition by spectroscopic analysis, confirmation was made on whether or not an absorption maximum existed in the wavelength range of 350 to 500 nm. Further, the maximum value in the absorption maximum within 350 to 500 nm wavelength range and the maximum value in the absorption maximum within 500 to 780 nm wavelength range were determined. Next, for the spectral characteristics, the integration value (area) of the spectral characteristics within the 350 to 500 nm wavelength range and the integration value (area) of the spectral characteristics within the 500 to 780 nm wavelength range were determined using the program attached to U-3000, and the ratio of these integration values (area ratio) was determined.

The results obtained for each dark yellow ink composition were as summarized in Table 2 below.

In Table 2, normal yellow ink compositions respectively represent a yellow ink of a cartridge (IC5CL05, manufactured by Seiko Epson Corp.) for PM-800C, a yellow ink of a cartridge (S020191, manufactured by Seiko Epson Corp.) for EPSON Stylus Color 760 (hereinafter often referred to as "SC-760"), and a yellow ink of a cartridge (MC5CL01, manufactured by Seiko Epson Corp.) for MC-2000. For these normal yellow ink compositions, the results of measurement done in the same manner as described above in connection with the dark yellow ink compositions are also shown in Table 2.

TABLE 2

|  | Dark yellow ink composition | | | | | Normal yellow ink composition | | |
|---|---|---|---|---|---|---|---|---|
|  | Example A1α | Example A2α | Example A3α | Example A4α | Example A5α | PM-800C | SC-760 | MC-2000 |
| Dark yellow ink composition | A1 | A2 | A3 | A4 | A1 | — | — | — |
| $L^*$ | 69.8 | 81.4 | 47.2 | 77.7 | 6.98 | 9.81 | 97.0 | 96.6 |
| $a^*$ | −28.8 | −15.5 | −6.81 | −19.9 | −28.8 | −17.1 | −17.0 | −17.5 |
| $b^*$ | 38.3 | 44.0 | 25.3 | 33.2 | 38.3 | 60.4 | 88.7 | 60.0 |
| Difference in lightness from normal yellow ink | 28.3 | 16.7 | 50.9 | 18.9 | 27.2 | — | — | — |
| Difference in $b^*$ from normal yellow ink | 22.0 | 16.4 | 35.1 | 26.8 | 50.4 | — | — | — |
| $|b^*/a^*|$ | 1.33 | 2.84 | 3.72 | 1.67 | 1.33 | 3.54 | 5.22 | 3.44 |

TABLE 2-continued

|  | Dark yellow ink composition | | | | | Normal yellow ink composition | | |
|---|---|---|---|---|---|---|---|---|
|  | Example A1α | Example A2α | Example A3α | Example A4α | Example A5α | PM-800C | SC-760 | MC-2000 |
| Area (350 to 500 nm) | 134.0 | 209.2 | 206.1 | 132.9 | 134.0 | — | — | — |
| Area (500 to 780 nm) | 68.7 | 34.0 | 147.8 | 60.7 | 68.7 | — | — | — |
| Integration value ratio (area ratio) | 1.95 | 6.15 | 1.39 | 2.19 | 1.95 | — | — | — |

Example A1α

An ink cartridge filled with dark yellow ink composition A1 was loaded into an ink jet printer PM-800C manufactured by Seiko Epson Corp., and printing was carried out on evaluation paper (Premium Glossy Photo Paper, manufactured by Seiko Epson Corp.). In printing, a printer driver for dark yellow ink was prepared and used.

The printing was carried out by the following method. At the outset, only a cartridge filled with the dark yellow ink composition was loaded into the ink jet printer PM-800C, and printing was carried out on the evaluation paper only in its portion where dark yellow ink was to be printed. Next, a black cartridge (IC1BK05, manufactured by Seiko Epson Corp.) for PM-800C and a color cartridge (IC5CL05, manufactured by Seiko Epson Corp.) for PM-800C were loaded into the above printer and were used to perform printing on the remaining portion of the print to form a color image. Printing in this way can provide the same printing results as in printing using an ink set of seven colors of black, cyan, light cyan, magenta, light magenta, yellow, and dark yellow.

In the same manner as described above, control in Example A1α was also printed. Specifically, conventional cartridges for PM-800C, that is, the above-described black cartridge for PM-800C and color cartridge for PM-800C, were used to perform printing of six colors of black, cyan, light cyan, magenta, light magenta, and yellow.

Example A2α

Printing was carried out in the same manner as in Example A1α, except that dark yellow ink composition A2 was used as the dark yellow ink instead of dark yellow ink composition A1. Also for control in Example A2α, printing was carried out in the same manner as in Example A1α.

Example A3α

Printing was carried out in the same manner as in Example A1α, except that dark yellow ink composition A3 was used as the dark yellow ink instead of dark yellow ink composition A1. Also for control in Example A3α, printing was carried out in the same manner as in Example A1α.

Example A4α

Printing was carried out in the same manner as in Example A1α, except that dark yellow ink composition A4 (a pigment-based ink composition) was used as the dark yellow ink instead of dark yellow ink composition A1 and MC-2000 manufactured by Seiko Epson Corp. and Premium Semigloss Photo Paper manufactured by Seiko Epson Corp. were used respectively as the evaluation printer and the evaluation paper. Here MC1BK01 manufactured by Seiko Epson Corp. was used as the black cartridge for MC-2000, and MC5CL01 manufactured by Seiko Epson Corp. was used as the color cartridge for MC-2000.

In the same manner as in Example A1α, control in Example A4α was also printed. Specifically, conventional cartridges for MC-2000, that is, the above-described black cartridge for MC-2000 and color cartridge for MC-2000, were used to perform printing of six colors of black, cyan, light cyan, magenta, light magenta, and yellow.

Example A5α

Printing was carried out in the same manner as in Example A1α, except that EPSON Stylus Color 760 manufactured by Seiko Epson Corp. was used as the evaluation printer. Specifically, dark yellow ink composition A1 was used as the dark yellow ink. Here S020189 manufactured by Seiko Epson Corp. was used as the black cartridge for EPSON Stylus Color 760, and S020191 manufactured by Seiko Epson Corp. was used as the color cartridge for EPSON Stylus Color 760. Printing using EPSON Stylus Color 760 in this way can provide the same printing results as in printing using an ink set of five colors of black, cyan, magenta, yellow, and dark yellow.

In the same manner as in Example A1α, control in Example A5α was also printed. Specifically, in the control printing, conventional cartridges for EPSON Stylus Color 760, that is, the above-described black cartridge for EPSON Stylus Color 760 and color cartridge for EPSON Stylus Color 760, were used to perform printing of four colors of black, cyan, magenta, and yellow.

β) Characteristics Determined from Records Produced by Impaction of Ink Composition Each ink composition was impacted into each of predetermined recording media at 1.85 mg/cm$^2$. For the records thus obtained, the spectral characteristics were measured with a GRETAG densitometer SPM-50 manufactured by GRETAG, Ltd. Premium Glossy Photo Paper and Photo Paper both manufactured by Seiko Epson Corp. were used as the recording media. Both the recording media had a whiteness W of not less than 90. In the printing test, combinations of ink compositions with recording media used were as described in Examples A1β to A8β below.

For each ink composition, the lightness was determined from spectral characteristics measured based on the records in the same manner as described above, and, in addition, a difference in lightness between each ink composition and a normal yellow ink composition was also determined. Further, for each ink composition, the absolute value of b*/a*, i.e., |b*/a*|, was determined. Furthermore, a difference in b* value between each dark yellow ink composition and a normal yellow ink composition used with the dark yellow ink composition was also determined.

Example A1β

Printing was carried out in the same manner as in Example A1α, except that dark yellow ink composition A5 was used as the dark yellow ink instead of dark yellow ink composition A1. Also for control in Example A1β, printing was carried out in the same manner as in Example A1α.

Example A2β

Printing was carried out in the same manner as in Example A1α, except that dark yellow ink composition A6 was used as the dark yellow ink instead of dark yellow ink composition A1. Also for control in Example A1β, printing was carried out in the same manner as in Example A1α.

Example A3β

Printing was carried out in the same manner as in Example A1α, except that dark yellow ink composition A7 was used as the dark yellow ink instead of dark yellow ink composition A1. Also for control in Example A1β, printing was carried out in the same manner as in Example A1α.

Example A4β

Printing was carried out in the same manner as in Example A1α, except that dark yellow ink composition A8 was used as the dark yellow ink instead of dark yellow ink composition A1. Also for control in Example A1β, printing was carried out in the same manner as in Example A1α.

Examples A5β to A8β

Printing was carried out in the same manner as in Examples A1β to A4β, except that Photo Paper manufactured by Seiko Epson Corp. was used as the recording medium instead of Premium Glossy Photo Paper. Also for control in each of Examples A5β to A8β, printing was carried out in the same manner as in Examples A1β to A4β.

The results obtained for each dark yellow ink composition were as summarized in Table 3 below.

In Table 3, the normal yellow ink composition represents a yellow ink of a cartridge (IC5CL05, manufactured by Seiko Epson Corp.) for PM-800C. For this normal yellow ink composition, measurement was carried out in the same manner as described above in connection with the dark yellow ink compositions. The results are also shown in Table 3.

Test A1: Graininess

Gradation patterns ranging from each hue (red (R), green (G), blue (B), cyan, magenta, and yellow) to black were printed according to Examples A1α to A5α and Examples A1β to A8β.

Next, each print pattern was scanned under the following conditions.

Scanner: DT-S1045AI, manufactured by Dainippon Screen Mfg. Co., Ltd.

Resolution: 1300 dpi

Object region of analysis: 512×512 pixels (10×10 mm)

Next, the scanned image data was transformed to an L*a*b* space, and two-dimensional FFT (two-dimensional fast Fourier transform) was carried out for the image in its L* component, followed by transform to a chroma coordinate system to bring the spectrum to one-dimensional one to obtain WS(u) as Wiener spectrum of the image. For this method, reference may be made to Imakawa et al., "Noise Evaluation Method for Halftone Color Image," Hardcopy' 96 Ronbunshu, 189–192 (1996).

Further, VTF(u) representing visual transfer function was determined according to equation (1) on the assumption that the least distance of distinct vision, l, was 300 mm.

$$VTF(u)=5.05\ exp(-0.138\pi lu/180)\{1-exp(-0.1\pi lu/180)\} \quad (1)$$

The graininess index was finally calculated from WS(u) and VTF(u) according to equation (2) to evaluate the graininess for each case.

$$(\text{Graininess index})=a(L^*)\int (WS(u))^{0.5} VTF(u)du \quad (2)$$

Here a(L*), which is lightness correction in equation (2), was obtained by equation (3). This is a simple method where only the L* component was used. This method, however, is an original one which had a high level of correlation, i.e., a correlation coefficient of 0.95, with the results of subjective evaluation using 8 types of ink jet printers and a gray patch of each 9 level of lightness of pictrography.

$$a(L^*)=((L^*+16)/116)^{0.8} \quad (3)$$

According to the above method, the graininess index was determined for the print pattern in each of the above examples, and, further, the graininess index for the control in each of the examples was also determined. For each of the

TABLE 3

| | \multicolumn{8}{c}{Dark yellow ink composition} | Normal yellow ink composition | |
|---|---|---|---|---|---|---|---|---|---|---|
| | Example A1β | Example A2β | Example A3β | Example A4β | Example A5β | Example A6β | Example A7β | Example A8β | | |
| Dark yellow ink composition | A5 | A6 | A7 | A8 | A5 | A6 | A7 | A8 | — | — |
| Recording medium | \multicolumn{4}{c}{Premium Glossy Photo Paper} | | | | \multicolumn{4}{c}{Photo Paper} | | Premium Glossy Photo Paper | Photo Paper |
| L* | 29.4 | 29.4 | 32.2 | 18.5 | 24.4 | 24.9 | 26.9 | 19.2 | 86.47 | 86.6 |
| a* | −10.2 | 0.99 | −6.65 | 1.24 | −6.73 | −0.18 | −5.7 | −0.26 | 5.21 | 10.4 |
| b* | 18.99 | 20.1 | 25.6 | 8.35 | 6.8 | 7.54 | 12 | 4.02 | 101.3 | 99.9 |
| Difference in lightness from normal yellow ink | 57.1 | 57.1 | 54.3 | 67.9 | 62.2 | 61.7 | 59.7 | 67.4 | — | — |
| Difference in b* from normal yellow ink | 93.1 | 92.4 | 87.9 | 95.9 | 82.3 | 81.2 | 75.7 | 93.0 | — | — |
| |b*/a*| | 1.86 | 20.3 | 3.85 | 6.73 | 1.01 | 41.9 | 2.11 | 15.5 | 19.5 | 9.6 | examples, the graininess index value was determined from these values by presuming the graininess index of the control to be 1.0. The graininess index values thus obtained were evaluated according to the following criteria. In this case, in the gradation pattern, the portion of $L^*=30$ (the portion of $L^*=15$ only for blue) was used as a comparison point. A lower graininess index value indicates lower graininess in the formed image and higher image quality.

A: Less than 0.7
B: Not less than 0.7 and less than 1.0
C: Not less than 1.0

The results were as summarized in Tables 4 and 5 below.

More specifically, the color reproduction range was determined by bringing evaluation $L^*$ values to 30, 40, and 50 and presuming the color reproduction area of the control in each example to be 100%. The color reproduction was evaluated based on the results as follows.

A: More than 105%
B: Not less than 100% and not more than 105%
C: Less than 100%

TABLE 4

| Gradation pattern | Example A1α | Example A2α | Example A3α | Example A4α | Example A5α |
|---|---|---|---|---|---|
| Red | A | A | A | A | A |
| Green | A | A | B | A | A |
| Blue | B | B | B | B | B |
| Cyan | A | A | A | A | A |
| Magenta | A | A | A | A | A |
| Yellow | B | B | B | B | B |

TABLE 5

| Gradation patern | Example A1β | Example A2β | Example A3β | Example A4β | Example A5β | Example A6β | Example A7β | Example A8β |
|---|---|---|---|---|---|---|---|---|
| Red | A | A | A | A | A | A | A | A |
| Green | A | A | A | A | B | A | B | A |
| Blue | B | B | B | B | B | B | B | B |
| Cyan | A | A | A | A | A | A | A | A |
| Magenta | A | A | A | A | A | A | A | A |
| Yellow | B | B | B | B | B | B | B | B |

Test A2: Color Reproduction

Patch patterns containing various hues with a unified predetermined $L^*$ value were printed according to Examples A1α to A5α and Examples A1β to A8β. These prints were subjected to colorimetric measurement to determine a* and b* values which were then used to determine a color reproduction range in predetermined $L^*$. The colorimetric measurement of the prints was carried out with a colorimeter SPM-50 manufactured by GRETAG, Ltd.

The results were as summarized in Tables 6 and 7 below.

TABLE 6

|  | Example A1α | Example A2α | Example A3α | Example A4α | Example A5α |
|---|---|---|---|---|---|
| Color reproduction range $L^* = 30$ | A | A | A | A | A |
| Color reproduction range $L^* = 40$ | A | B | A | A | A |
| Color reproduction range $L^* = 50$ | B | B | B | B | B |

TABLE 7

|  | Example A1β | Example A2β | Example A3β | Example A4β | Example A5β | Example A6β | Example A7β | Example A8β |
|---|---|---|---|---|---|---|---|---|
| Color reproduction range $L^* = 30$ | A | A | A | A | A | A | A | A |
| Color reproduction range $L^* = 40$ | A | A | A | A | B | A | A | B |
| Color reproduction range $L^* = 50$ | B | B | B | B | B | B | B | B |

Test B

Preparation of Ink Compositions

Ingredients shown in Table 8 below were mixed together according to formulations specified in Table 8. The mixtures were filtered under pressure through a membrane filter having a pore diameter of 8 μm to prepare dark yellow ink compositions B1 to B5.

Here the amount of each ingredient in ink was expressed in % by weight (wt %) of the ingredient based on the total weight of the ink composition.

TABLE 8

|  |  | Dark yellow ink composition (unit: wt %) | | | | |
|---|---|---|---|---|---|---|
|  |  | B1 | B2 | B3 | B4 | B5 |
| Colorant | C.I. Direct Black 195 |  | 0.75 | 0.5 | 0.6 | 0.6 |
|  | Magenta dye represented by formula M-4 | 1.9 | 0.5 |  | 0.4 | 0.5 |
|  | C.I. Direct Blue 199 | 0.9 |  |  | 0.1 |  |
|  | C.I. Direct Yellow 86 | 0.6 | 0.6 | 0.8 | 0.5 | 0.5 |
|  | C.I. Direct Yellow 173 | 2.0 | 2.0 | 2.9 | 1.9 | 1.9 |
| Organic solvent etc. | Glycerin | 10 | 10 | 10 | 10 | 10 |
|  | Diethylene glycol |  | 6 |  | 6 | 6 |
|  | Triethylene glycol | 5 |  | 7 |  |  |
|  | Triethylene glycol monobutyl ether | 10 | 10 | 10 |  |  |
|  | Olfine E1010 |  | 2 | 2 |  |  |
|  | Olfine STG | 2 |  |  | 2 | 2 |
| pH adjustor | Triethanolamine | 0.3 | 0.3 | 0.3 | 0.3 | 0.3 |
| Preservative | Proxel XL-2 | 0.3 | 0.3 | 0.3 | 0.3 | 0.3 |
|  | Water | Balance | Balance | Balance | Balance | Balance |

Measurement of Characteristics of Ink Compositions

Spectral characteristics of each dark yellow ink composition were measured with a spectrophotometer U-3000 manufactured by Hitachi, Ltd. In the measurement, ion-exchanged water was added to 1 ml of ink to bring the total volume to 1000 ml. The dilution was then subjected to the measurement of spectral characteristics using a quartz cell with an optical path length of 1 cm in a transmission mode.

Further, $L^*$, $a^*$, and $b^*$ values of each ink composition were determined using a program for color analysis (a program for color analysis attached to U-3000) from the measured spectral characteristics, and, in addition, for each ink composition, the absolute value of $b^*/a^*$, i.e., $|b^*/a^*|$, was determined. Furthermore, a difference in $b^*$ value between each dark yellow ink composition and a normal yellow ink composition was also determined. Furthermore, a difference in lightness between each dark yellow ink composition and a normal yellow ink composition used with the dark yellow ink composition was also determined.

In the spectral characteristics obtained for each dark yellow ink composition by spectroscopic analysis, confirmation was made on whether or not an absorption maximum existed in the wavelength range of 350 to 500 nm. Further, the absorption maximum value within 350 to 500 nm wavelength range was determined and was compared with the absorption maximum value within 500 to 780 nm wavelength range. Next, for the spectral characteristics, the integration value (area) of the spectral characteristics within the 350 to 500 nm wavelength range and the integration value (area) of the spectral characteristics within the 500 to 780 nm wavelength range were determined using the program attached to U-3000, and the ratio of these integration values (area ratio) was determined.

The results obtained for each dark yellow ink composition were as summarized in Table 9 below. In Table 9, the normal yellow ink composition is a yellow ink composition of a cartridge (IC5CL05, manufactured by Seiko Epson Corp.) for PM-800C. For this normal yellow ink composition, measurement was carried out in the same manner as described above in connection with the dark yellow ink compositions. The results are also shown in Table 9.

TABLE 9

|  | Dark yellow ink composition | | | | | Normal yellow ink composition |
|---|---|---|---|---|---|---|
|  | B1 | B2 | B3 | B4 | B5 |  |
| L* | 74.6 | 73.1 | 81.4 | 72.7 | 73.1 | 98.1 |
| a* | −14.3 | −5.63 | −15.5 | −6.92 | −0.70 | −17.1 |
| b* | 25.5 | 30.1 | 44.0 | 22.4 | 25.4 | 60.4 |
| Difference in lightness from normal yellow ink | 23.5 | 25.0 | 16.7 | 25.4 | 25.0 | — |
| Difference in b* from normal yellow ink | 34.9 | 30.3 | 16.4 | 38.0 | 35.0 | — |
| \|b*/a*\| | 1.78 | 5.34 | 2.83 | 3.25 | 36.4 | 3.54 |
| Area ( 350 to 500 nm) | 162.1195 | 171.1 | 209.2 | 151.6 | 155.5 | — |
| Area ( 500 to 780 nm) | 69.0 | 55.5 | 34.0 | 55.1 | 50.0 | — |
| Integration value ratio (area ratio) | 2.35 | 3.08 | 6.15 | 3.08 | 3.11 | — |

α) Printing Test of Dark Yellow Ink Compositions

A black cartridge for an ink jet printer PM-800C manufactured by Seiko Epson Corp. was filled with a dark yellow ink composition instead of black. This cartridge was loaded into an ink jet printer PM-800C, and printing was carried out on an evaluation paper (Premium Glossy Photo Paper manufactured by Seiko Epson Corp.). In the printing, a printer driver for a dark yellow ink was prepared and used.

For each of dark yellow ink compositions B1 to B5, the printing test was carried out for the following evaluation tests B1 to B4.

Test B1: Recovery from nozzle clogging (anti-clogging property)

Each of the dark yellow ink compositions B1 to B5 was loaded into a head of the printer PM-800C. After ejection of the ink through all nozzles was confirmed by printing, the printer was allowed to stand without capping under an environment of 40° C. for one month. After the one-month standing, the power supply of the printer was turned on, and the number of cleaning operations required for all the nozzles to normally eject the ink was counted. The recovery from nozzle clogging (anti-clogging property of the ink compositions) was evaluated based on the number of cleaning operations according to the following criteria.

A: Once
B: Twice to four times
C: Five times

Test B2: Lightfastness

For each of the dark yellow ink compositions, the formation of blotted images (solid printing) was carried out on the recording medium. The prints were tested for lightfastness for 6 days by means of a xenon weather-o-meter Ci5000 manufactured by Atlas Electric Device. In this case, $\Delta E^*ab$ was determined based on the results of measurements done before and after the test by means of a GRETAG densitometer (manufactured by GRETAG, Ltd.). $\Delta E^*ab$ was determined according to equation (i). The lightfastness of each of the dark yellow ink composition was evaluated from the results according to the following criteria.

$$\Delta E^*ab = [(\Delta L^*)^2 + (\Delta a^*)^2 + (\Delta b^*)^2]^{1/2} \quad (i)$$

A: $\Delta E^*ab$ of not more than 10
B: $\Delta E^*ab$ of not less than 10 and not more than 20
C: $\Delta E^*ab$ of not less than 20

Test B3: Waterfastness

For each of the dark yellow ink compositions, the formation of blotted images (solid printing) was carried out on the recording medium, followed by drying to provide prints. Pure water was then put dropwise onto the prints. One min after dropping of the pure water, the prints were inspected for marks of water droplets. The waterfastness of each of the dark yellow ink compositions was evaluated from the results according to the following criteria.

A: Marks of water droplets were hardly left.
B: Marks of water droplets were somewhat left.
C: Marks of water droplets were considerably left.

Test B4: Fastness to Moisture

For each of the dark yellow ink compositions, outline (void) characters were printed on the recording medium. The prints were dried, and then allowed to stand for three days under an environment of 40° C. and 85% RH. After the standing, the prints were inspected for blurring of ink characters. The fastness of each of the dark yellow ink compositions to moisture was evaluated from the results according to the following criteria.

A: Void portions were not blurred at all.
B: The characters were still legible, although void portions were somewhat blurred.
C: Void portions were considerably blurred, rendering the characters considerably illegible.

The results of evaluation obtained for evaluation tests B1 to B4 were as summarized in Table 10 below.

TABLE 10

| Evaluation items | Dark yellow ink composition | | | | |
|---|---|---|---|---|---|
| | B1 | B2 | B3 | B4 | B5 |
| Anti-clogging property | C | C | B | A | A |
| Lightfastness | A | A | A | A | A |
| Waterfastness | A | A | B | A | A |
| Fastness to moisture | A | A | B | A | A |

β) Printing Test Using Ink Sets

Example B1

An ink cartridge filled with dark yellow ink composition B1 was loaded into an ink jet printer PM-800C manufactured by Seiko Epson Corp., and printing was carried out on evaluation paper (Premium Glossy Photo Paper, manufactured by Seiko Epson Corp.). In printing, a printer driver for dark yellow ink was prepared and used.

The printing was carried out by the following method. At the outset, only a cartridge filled with the dark yellow ink composition was loaded into the ink jet printer PM-800C, and printing was carried out on the evaluation paper only in its portion where dark yellow ink was to be printed. Next, ink cartridges filled respectively with color ink compositions other than the dark yellow inks described in Table 8 and an ink cartridge filled with a black ink composition were loaded into the above printer and were used to perform printing on the remaining portion of the print to form a color image. Printing in this way can provide the same printing results as in printing using an ink set of seven colors of black, cyan, light cyan, magenta, light magenta, yellow, and dark yellow.

In the same manner as described above, control in Example B1 was also printed. Specifically, in the control printing, an ink cartridge of the color ink described in Table 8 above and an ink cartridge of black ink were used to perform printing of six colors of black, cyan, light cyan, magenta, light magenta, and yellow.

Example B2

Printing was carried out in the same manner as in Example B1, except that dark yellow ink composition B2 was used as the dark yellow ink instead of dark yellow ink composition B1. Also for control in Example B2, printing was carried out in the same manner as in Example B1.

Example B3

Printing was carried out in the same manner as in Example B1, except that dark yellow ink composition B3 was used as the dark yellow ink instead of dark yellow ink composition B1. Also for control in Example B3, printing was carried out in the same manner as in Example B1.

Example B4

Printing was carried out in the same manner as in Example B1, except that dark yellow ink composition B4 was used as the dark yellow ink instead of dark yellow ink composition B1. Also for control in Example B4, printing was carried out in the same manner as in Example B1.

Example B5

Printing was carried out in the same manner as in Example B1, except that dark yellow ink composition B5 was used as the dark yellow ink instead of dark yellow ink composition B1. Also for control in Example B5, printing was carried out in the same manner as in Example B1.

Test B5: Graininess

Gradation patterns ranging from each hue (red (R), green (G), blue (B), cyan, magenta, and yellow) to black were printed according to Examples B1 to B5.

Next, each print pattern was scanned under the following conditions.

Scanner: DT-S1045AI, manufactured by Dainippon Screen Mfg. Co., Ltd.

B1 to B5. These prints were subjected to calorimetric measurement to determine a* and b* values which were then used to determine a color reproduction range in predetermined L*. The colorimetric measurement of the prints was carried out with a calorimeter SPM-50 manufactured by GRETAG, Ltd.

More specifically, the color reproduction range was determined by bringing evaluation L* values to 30, 40, and 50 and presuming the color reproduction area of the control in each example to be 100%. The color reproduction was evaluated based on the results as follows.

A: More than 105%

B: Not less than 100% and not more than 105%

C: Less than 100%

The results were as summarized in Table 12 below.

TABLE 11

| Gradation pattern | Example B1 | Example B2 | Example B3 | Example B4 | Example B5 |
| --- | --- | --- | --- | --- | --- |
| Red | A | A | A | A | A |
| Green | A | A | A | A | A |
| Blue | B | B | B | B | B |
| Cyan | A | A | A | A | A |
| Magenta | A | A | A | A | A |
| Yellow | B | B | B | B | B |

TABLE 12

| | Example B1 | Example B2 | Example B3 | Example B4 | Example B5 |
| --- | --- | --- | --- | --- | --- |
| Color reproduction range L* = 30 | A | A | A | A | A |
| Color reproduction range L* = 40 | A | A | B | A | A |
| Color reproduction range L* = 50 | B | B | B | B | B |

Resolution: 1300 dpi

Object region of analysis: 512×512 pixels (10×10 mm)

Next, in the same manner as described above in connection with test A1, the graininess index was determined for the print pattern in each of the above examples, and, further, the graininess index for the control in each of the examples was also determined. For each of the examples, the graininess index value was determined from these values by presuming the graininess index of the control to be 1.0. The graininess index values thus obtained were evaluated according to the following criteria. In this case, in the gradation pattern, the portion of L*=30 (the portion of L*=15 only for blue) was used as a comparison point. A lower graininess index value indicates lower graininess in the formed image and higher image quality.

A: Less than 0.7

B: Not less than 0.7 and less than 1.0

C: Not less than 1.0

The results were as summarized in Table 11 below.

Test B6: Color Reproduction

Patch patterns containing various hues with a unified predetermined L* value were printed according to Examples Test C Preparation of Ink Compositions Ingredients shown in Table 13 below were mixed together according to formulations specified in Table 13. The mixtures were filtered under pressure through a membrane filter having a pore diameter of 4 μm to prepare dark yellow ink compositions C1 and C2. A normal yellow ink composition, a magenta ink composition, a cyan ink composition, a light magenta ink composition, a light cyan ink composition, and a black ink composition were prepared in the same manner as described above, except that ingredients for these ink compositions shown in Table 13 were mixed together according to formulations specified in Table 13.

Here the amount of each ingredient in ink was expressed in % by weight (wt %) of the ingredient based on the total weight of the ink composition.

TABLE 13

| | | Ink composition (unit: wt %) | | | | | | | |
|---|---|---|---|---|---|---|---|---|---|
| | | Dark yellow | | Normal yellow | Magenta | Cyan | Light magenta | Light cyan | Black |
| | | C1 | C2 | | | | | | |
| Colorant | C.I. Pigment Blue 15:3 | 0.5 | | | | 2 | | 0.6 | |
| | C.I. Pigment Red 122 | 0.75 | | | 3.5 | | 0.7 | | |
| | C.I. Pigment Yellow 128 | 4 | 3.2 | 3.8 | | | | | |
| | Carbon black | | 0.5 | | | | | | 3 |
| Water-soluble organic solvent etc. | Glycerin | 8 | 10 | 10 | 13 | 12 | 18 | 21 | 12 |
| | Ethylene glycol | 2 | 2 | 2 | 6 | 5 | 6 | | 4 |
| | Diethylene glycol | | 8 | | | | 4 | 6 | |
| | Triethylene glycol monobutyl ether | 5 | 5 | 5 | 5 | 5 | 5 | 5.5 | 8 |
| | Olfine E1010 | 0.8 | 1 | 1 | 1 | 0.75 | 0.8 | 1 | 0.9 |
| pH adjustor | Triethanolamine | 0.5 | 0.5 | 0.5 | 0.9 | 0.9 | 0.5 | 0.8 | 0.9 |
| Dispersant | Styrene-acrylic acid copolymer | 2.6 | 2.1 | 1.9 | 1.2 | 0.8 | 0.3 | 0.3 | 1.3 |
| Preservative | Proxel XL-2 | 0.3 | 0.3 | 0.3 | 0.3 | | 0.3 | | 0.3 |
| | Water | Balance | Balance | Balance | Balance | Balance | Balance | Balance | Balance |

Measurement of Characteristics of Ink Compositions

Spectral characteristics of each dark yellow ink composition were measured with a spectrophotometer U-3000 manufactured by Hitachi, Ltd. In the measurement, ion-exchanged water was added to 1 ml of ink to bring the total volume to 1000 ml. The dilution was then subjected to the measurement of spectral characteristics using a quartz cell with an optical path length of 1 cm in a transmission mode.

Further, $L^*$, $a^*$, and $b^*$ values of each ink composition were determined using a program for color analysis (a program for color analysis attached to U-3000) from the measured spectral characteristics, and, in addition, for each ink composition, the absolute value of $b^*/a^*$, i.e., $|b^*/a^*|$, was determined. Furthermore, a difference in $b^*$ value between each dark yellow ink composition and a normal yellow ink composition was also determined. Furthermore, a difference in lightness between each dark yellow ink composition and a normal yellow ink composition used with the dark yellow ink composition was also determined.

In the spectral characteristics obtained for each dark yellow ink composition by spectroscopic analysis, confirmation was made on whether or not an absorption maximum existed in the wavelength range of 350 to 500 nm. Further, the absorption maximum value within 350 to 500 nm wavelength range was determined and was compared with the absorption maximum value within 500 to 780 nm wavelength range. Next, for the spectral characteristics, the integration value (area) of the spectral characteristics within the 350 to 500 nm wavelength range and the integration value (area) of the spectral characteristics within the 500 to 780 nm wavelength range were determined using the program attached to U-3000, and the ratio of these integration values (area ratio) was determined.

The results obtained for each dark yellow ink composition were as summarized in Table 14 below. Further, for normal yellow ink composition C, measurement was carried out in the same manner as described above in connection with the dark yellow ink compositions. The results are also shown in Table 14.

TABLE 14

| | Dark yellow ink composition C1 | Dark yellow ink composition C2 | Normal yellow ink composition |
|---|---|---|---|
| $L^*$ | 77.7 | 75.2 | 96.6 |
| $a^*$ | −19.9 | −8.5 | −17.5 |
| $b^*$ | 33.2 | 44.5 | 60.0 |
| Difference in lightness from normal yellow ink | 18.9 | 21.4 | — |
| Difference in $b^*$ from normal yellow ink | 26.8 | 15.5 | — |
| $|b^*/a^*|$ | 2.2 | 2.1 | 3.4 |
| Area (350 to 500 nm) | 132.9 | 144.6 | — |
| Area (500 to 780 nm) | 60.7 | 67.4 | — |
| Integration value ratio (area ratio) | 1.7 | 5.2 | — |

α) Printing Test of Dark Yellow Ink Compositions

A black cartridge for an ink jet printer MC-2000 manufactured by Seiko Epson Corp. was filled with a dark yellow ink composition instead of black. This cartridge was loaded into an ink jet printer MC-2000, and printing was carried out on an evaluation paper (Premium Semigloss Photo Paper manufactured by Seiko Epson Corp.). In the printing, a printer driver for a dark yellow ink was prepared and used.

For each of dark yellow ink compositions C1 and C5, the printing test was carried out for the following evaluation tests C1 to C4.

Test C1: Recovery from Nozzle Clogging (Anti-clogging Property)

Each of the dark yellow ink compositions C1 and C2 was loaded into a head of the printer MC-2000. After ejection of the ink through all nozzles was confirmed by printing, the printer was allowed to stand without capping under an environment of 40° C. for one month. After the one-month standing, the power supply of the printer was turned on, and the number of cleaning operations required for all the nozzles to normally eject the ink was counted. The recovery from nozzle clogging (anti-clogging property of the ink compositions) was evaluated based on the number of cleaning operations according to the following criteria.

A: Once
B: Twice to four times
C: Five times
Test C2: Lightfastness

For each of the dark yellow ink compositions, the formation of blotted images (solid printing) was carried out on the recording medium. The prints were tested for lightfastness for 6 days by means of a xenon weather-o-meter Ci5000 manufactured by Atlas Electric Device. In this case, $\Delta E^*ab$ was determined based on the results of measurements done before and after the test by means of a GRETAG densitometer (manufactured by GRETAG, Ltd.). $\Delta E^*ab$ was determined according to equation (i). The lightfastness of each of the dark yellow ink composition was evaluated from the results according to the following criteria.

$$\Delta E^*ab=[(\Delta L^*)^2+(\Delta a^*)^2+(\Delta b^*)^2]^{1/2} \quad (i)$$

A: $\Delta E^*ab$ of not more than 10
B: $\Delta E^*ab$ of not less than 10 and not more than 20
C: $\Delta E^*ab$ of not less than 20

Test C3: Waterfastness

For each of the dark yellow ink compositions, the formation of blotted images (solid printing) was carried out on the recording medium, followed by drying to provide prints. Pure water was then put dropwise onto the prints. One min after dropping of the pure water, the prints were inspected for marks of water droplets. The waterfastness of each of the dark yellow ink compositions was evaluated from the results according to the following criteria.

A: Marks of water droplets were hardly left.
B: Marks of water droplets were somewhat left.
C: Marks of water droplets were considerably left.

Test C4: Fastness to Moisture

For each of the dark yellow ink compositions, outline (void) characters were printed on the recording medium. The prints were dried, and then allowed to stand for three days under an environment of 40° C. and 85% RH. After the standing, the prints were inspected for blurring of ink characters. The fastness of each of the dark yellow ink compositions to moisture was evaluated from the results according to the following criteria.

A: Void portions were not blurred at all.
B: The characters were still legible, although void portions were somewhat blurred.
C: Void portions were considerably blurred, rendering the characters considerably illegible.

The results of evaluation obtained for evaluation tests C1 to C4 were as summarized in Table 15 below.

TABLE 15

| Evaluation items | Dark yellow ink composition | |
| --- | --- | --- |
| | C1 | C2 |
| Anti-clogging property | B | A |
| Lightfastness | A | A |
| Waterfastness | A | A |
| Fastness to moisture | A | A |

β) Printing Test Using Ink Sets

Example C1

An ink cartridge filled with dark yellow ink composition C1 was loaded into an ink jet printer MC-2000 manufactured by Seiko Epson Corp., and printing was carried out on evaluation paper (Premium Semigloss Photo Paper, manufactured by Seiko Epson Corp.). In printing, a printer driver for dark yellow ink was prepared and used.

The printing was carried out by the following method. At the outset, only a cartridge filled with the dark yellow ink composition was loaded into the ink jet printer MC-2000, and printing was carried out on the evaluation paper only in its portion where dark yellow ink was to be printed. Next, ink cartridges filled respectively with color ink compositions other than the dark yellow inks described in Table 13 and an ink cartridge filled with a black ink composition were loaded into the above printer and were used to perform printing on the remaining portion of the print to form a color image. Printing in this way can provide the same printing results as in printing using an ink set of seven colors of black, cyan, light cyan, magenta, light magenta, yellow, and dark yellow.

In the same manner as described above, control in Example C1 was also printed. Specifically, in the control printing, an ink cartridge of the color ink described in Table 13 above and an ink cartridge of black ink used to perform printing of six colors of black, cyan, light cyan, magenta, light magenta, and yellow.

Example C2

Printing was carried out in the same manner as in Example C1, except that dark yellow ink composition C2 was used as the dark yellow ink instead of dark yellow ink composition C1. Also for control in Example C2, printing was carried out in the same manner as in Example C1.

Test C1: Graininess

Gradation patterns ranging from each hue (red (R), green (G), blue (B), cyan, magenta, and yellow) to black were printed according to Example C1 and C2.

Next, each print pattern was scanned under the following conditions.

Scanner: DT-S1045AI, manufactured by Dainippon Screen Mfg. Co., Ltd.
Resolution: 1300 dpi
Object region of analysis: 512×512 pixels (10×10 mm)

Next, in the same manner as described above in connection with test A1, the graininess index was determined for the print pattern in each of the above examples, and, further, the graininess index for the control in each of the examples was also determined. For each of the examples, the graininess index value was determined from these values by presuming the graininess index of the control to be 1.0. The graininess index values thus obtained were evaluated according to the following criteria. In this case, in the gradation pattern, the portion of L*=30 (the portion of L*=15 only for blue) was used as a comparison point. A lower graininess index value indicates lower graininess in the formed image and higher image quality.

A: Less than 0.7
B: Not less than 0.7 and less than 1.0
C: Not less than 1.0

The results were as summarized in Table 16 below.

Test C2: Color reproduction

Patch patterns containing various hues with a unified predetermined L* value were printed according to Example C1 and C2. These prints were subjected to colorimetric measurement to determine a* and b* values which were then used to determine a color reproduction range in predetermined L*. The colorimetric measurement of the prints was carried out with a colorimeter SPM-50 manufactured by GRETAG, Ltd.

More specifically, the color reproduction range was determined by bringing evaluation L* values to 30 and 40 and presuming the color reproduction area of the control in each example to be 100%. The color reproduction was evaluated based on the results as follows.

A: More than 105%
B: Not less than 100% and not more than 105%
C: Less than 100%

The results were as summarized in Table 17 below.

TABLE 16

| Gradation pattern | Example C1 | Example C2 |
|---|---|---|
| Red | A | A |
| Green | A | A |
| Blue | B | B |
| Cyan | A | A |
| Magenta | A | A |
| Yellow | B | B |

TABLE 17

| | Example C1 | Example C2 |
|---|---|---|
| Color reproduction range L* = 30 | A | A |
| Color reproduction range L* = 40 | A | B |

What is claimed is:

1. An ink set comprising at least a normal yellow ink composition and a dark yellow ink composition, the lightness of the dark yellow ink composition being lower than that of the normal yellow ink composition.

2. The ink set according to claim 1, wherein the lightness of the ink composition is the lightness of an L*a*b* color system as calculated from the spectral characteristics of a 1000-fold dilution of the ink composition with water.

3. The ink set according to claim 2, wherein the difference in lightness between the normal yellow ink composition and the dark yellow ink composition is 10 to 70.

4. The ink set according to claim 2, wherein the dark yellow ink composition has a lightness of 20 to 90.

5. The ink set according to claim 2, wherein the normal yellow ink composition has a lightness of not less than 90.

6. The ink set according to claim 1, wherein the lightness of the ink composition is the lightness of an L*a*b* color system as calculated from the spectral characteristics of a record produced by evenly impacting the ink composition at 1.48 to 2.22 mg/cm² into a recording medium having a whiteness W of not less than 90 as measured according to JIS Z 8715.

7. The ink set according to claim 6, wherein the lightness of the ink composition is calculated at a level of ink impaction into the recording medium of 1.85 mg/cm².

8. The ink set according to claim 6, wherein the difference in lightness between the normal yellow ink composition and the dark yellow ink composition is 20 to 70.

9. The ink set according to claim 1, wherein, for the dark yellow ink composition, the absolute value of b*/a* in the L*a*b* color system as calculated from the spectral characteristics of a 1000-fold dilution of the dark yellow ink composition with water is not less than 0.83 and the b* value is not less than zero (0).

10. The ink set according to claim 9, wherein the b* value of the dark yellow ink composition is smaller than the b* value of the normal yellow ink composition as calculated from the spectral characteristics of a 1000-fold dilution of the normal yellow ink composition with water.

11. The ink set according to claim 10, wherein the difference in b* value between the normal yellow ink composition and the dark yellow ink composition is not less than 20.

12. The ink set according to claim 11, wherein the absolute value of b*/a* of the normal yellow ink composition is not less than 1.73.

13. The ink set according to claim 11, wherein the absolute value of b*/a* of the normal yellow ink composition is not less than 1.73 and the b* value is not less than 50.

14. The ink set according to claim 10, wherein the b* value of the dark yellow ink composition is in the range of 10 to 50 while the b* value of the normal yellow ink composition is in the range of 60 to 90.

15. The ink set according to claim 1, wherein the absolute value of b*/a* in the L*a*b* color system of the dark yellow ink composition as calculated from the spectral characteristics of a record produced by evenly impacting the ink composition into a recording medium having a whiteness W of not less than 90 at 1.48 to 2.22 mg/cm² is not less than 0.83 and the b* value is not less than zero (0).

16. The ink set according to claim 15, wherein the absolute value of b*/a* and the b* value are calculated at a level of ink impaction into the recording medium of 1.85 mg/cm².

17. The ink set according to claim 15, wherein the b* value of the dark yellow ink composition is smaller than the b* value of the normal yellow ink composition.

18. The ink set according to claim 17, wherein the difference in b* value between the normal yellow ink composition and the dark yellow ink composition is not less than 30.

19. The ink set according to claim 18, wherein the absolute value of b*/a* of the normal yellow ink composition is not less than 1.73.

20. The ink set according to claim 1, wherein the dark yellow ink composition, when spectroscopically analyzed on a 1000-fold dilution thereof with water, has at least one absorption maximum in the wavelength range of 350 to 500 nm.

21. The ink set according to claim 20, wherein, in the spectroscopic analysis of a 1000-fold dilution of the dark yellow ink composition with water, the absorption maximum value in the wavelength range of 350 to 500 nm is larger than that in the wavelength range of 500 to 780 nm.

22. The ink set according to claim 20, wherein, in the spectroscopic analysis of a 1000-fold dilution of the dark yellow ink composition with water, the integration value of the spectral characteristics in the wavelength range of 350 to 500 nm is 1.5 to 10 times the integration value of the spectral characteristics in the wavelength range of 500 to 780 nm.

23. The ink set according to claim 1, wherein the dark yellow ink composition comprises, as colorants, at least one first colorant selected from the group consisting of compounds represented by formula (I) and (II)

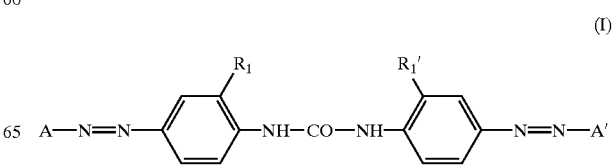

(I)

-continued

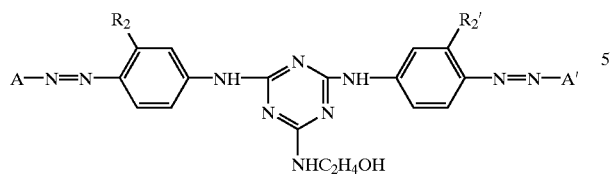
(II)

wherein $R_1$, $R_1'$, $R_2$, and $R_2'$ each independently represent $CH_3$ or $OCH_3$; and A and A' each independently represent a group having a structure selected from the group consisting of

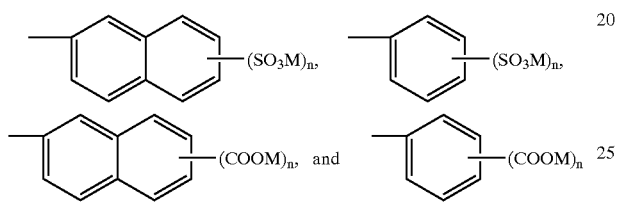

wherein

M represents hydrogen, lithium, sodium, potassium, ammonium, or an organic amine; and n is an integer of 1 or 2, and at least one second colorant selected from the group consisting of magenta, cyan, and black dyes.

24. The ink set according to claim 23, wherein the first colorant is selected from the group consisting of C.I. Direct Yellow 50, C.I. Direct Yellow 55, C.I. Direct Yellow 86, C.I. Direct Yellow 132, and C.I. Direct Yellow 173.

25. The ink set according to claim 23, wherein the second colorant is selected from the group consisting of:

magenta dyes selected from compounds represented by formula (III)

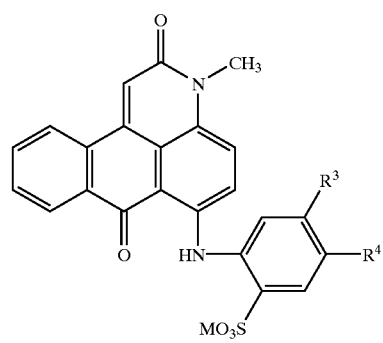
(III)

wherein

M represents hydrogen, lithium, sodium, potassium, ammonium, or an organic amine, and $R^3$ represents chlorine or a group represented by formula

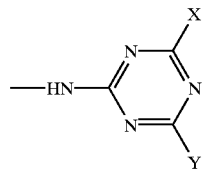

wherein

X represents an anilino group substituted by at least one $SO_3M$, and

Y represents OH, chlorine, or a morpholino group, $R^4$ represents hydrogen, chlorine, $SO_3M$, or a $C_1$–$C_4$ alkyl group, or compounds represented by formula (IV)

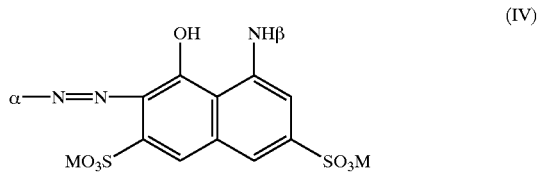
(IV)

wherein

α represents a $C_1$–$C_4$ alkyl or alkoxy group or an OH—, $SO_3H$—, or COOM-substituted phenyl or naphthyl group, β represents hydrogen or a group represented by formula

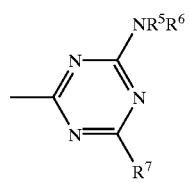

wherein $R^5$ represents hydrogen or an OH— or COOH-substituted $C_1$–$C_4$ alkyl group, $R^6$ represents an OH—, $OCH_3$—, $OC_2H_5$—, $SO_3M$—, or COOM-substituted $C_1$–$C_4$ alkyl or phenyl group, $R^7$ represents OH, COOH, or $NHR^8$, and $R^8$ represents an $SO_3M$— or COOH-substituted $C_1$–$C_4$ alkyl group, M represents hydrogen, lithium, sodium, potassium, ammonium, or an organic amine;

cyan dyes selected from compounds represented by formula (V)

$$\left[\begin{array}{c}\text{[phthalocyanine-Cu structure]}\end{array}\right] \begin{array}{l}-(SO_3M)_l\\-(SO_2NH_2)_m\\-(R^9)_n\end{array} \quad (V)$$

wherein
  $R^9$ represents OH, COOM, or $R^{10}$COOM wherein $R^{10}$ represents $C_4$–$C_9$ alkyl group, and
  l, m, and n are each 0 to 4, provided that (l+m+n)=4; and
  black dyes selected from C.I. Direct Black 195, C.I. Food Black 2, C.I. Sulfur Black 1, or C.I. Reactive Black 31 or C.I. Reactive Black 35.

26. The ink set according to claim 1, wherein the dark yellow ink composition comprises, as colorants, at least one first colorant selected from the group consisting of C.I. Pigment Yellow 74, C.I. Pigment Yellow 93, C.I. Pigment Yellow 109, C.I. Pigment Yellow 110, C.I. Pigment Yellow 128, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185, and at least one second colorant selected from the group consisting of C.I. Pigment Blue 15:3, C.I. Pigment Blue 15:4, C.I. Pigment Blue 60, C.I. Pigment Red 122, C.I. Pigment Red 202, C.I. Pigment Red 209, C.I. Pigment Violet 19, and carbon black.

27. The ink set according to claim 26, wherein the content of the first colorant in the dark yellow ink composition is 0.1 to 10% by weight and the content of the second colorant in the dark yellow ink composition is 0.1 to 10% by weight.

28. The ink set according to claim 26, wherein the normal yellow ink composition comprises, as a colorant, at least one member selected from the group consisting of C.I. Pigment Yellow 74, C.I. Pigment Yellow 93, C.I. Pigment Yellow 109, C.I. Pigment Yellow 110, C.I. Pigment Yellow 128, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185.

29. The ink set according to claim 26, which further contains a magenta ink composition and a cyan ink composition,
  said magenta ink composition containing, as a colorant, at least one member selected from the group consisting of C.I. Pigment Red 122, C.I. Pigment Red 202, C.I. Pigment Red 209, and C.I. Pigment Violet 19, said cyan ink composition containing, as a colorant, at least one member selected from the group consisting of C.I. Pigment Blue 15:3, C.I. Pigment Blue 15:4, and C.I. Pigment Blue 60.

30. The ink set according to claim 29, which further contains a black ink composition,
  said black ink composition containing at least carbon black as a colorant.

31. The ink set according to claim 26, which further contains two magenta ink compositions different from each other in color density and two cyan ink compositions different from each other in color density,
  the two magenta ink compositions, different from each other in color density, each independently containing, as a colorant, at least one member selected from the group consisting of C.I. Pigment Red 122, C.I. Pigment Red 202, C.I. Pigment Red 209, and C.I. Pigment Violet 19,
  the two cyan ink compositions, different from each other in color density, each independently containing, as a colorant, at least one member selected from the group consisting of C.I. Pigment Blue 15:3, C.I. Pigment Blue 15:4, and C.I. Pigment Blue 60.

32. The ink set according to claim 1, wherein the dark yellow ink composition contains at least a colorant, a water-soluble organic solvent, and water.

33. The ink set according to claim 32, wherein the colorant is a dye or a pigment.

34. The ink set according to claim 32, wherein the dark yellow ink composition contains at least a yellow colorant as the colorant.

35. The ink set according to claim 32, wherein the dark yellow ink composition contains a lower alkyl ether of a polyhydric alcohol as the water-soluble organic solvent.

36. The ink set according to claim 32, wherein the dark yellow ink composition further contains a surfactant.

37. The ink set according to claim 36, wherein the surfactant is an acetylene glycol surfactant.

38. The ink set according to claim 1, which further contains a magenta ink composition and a cyan ink composition.

39. The ink set according to claim 38, which further contains a black ink composition.

40. The ink set according to claim 1, which further contains two magenta ink compositions different from each other in color density and two cyan ink compositions different from each other in color density.

41. The ink set according to claim 1, which is used in an ink jet recording method.

42. A recording method comprising the step of depositing an ink composition onto a recording medium to perform printing, wherein the ink set according to claim 1 is used.

43. A record produced by the recording method according to claim 42.

44. An ink jet recording method comprising the steps of: ejecting droplets of an ink composition; and depositing the droplets onto a recording medium to perform printing, wherein
  the ink set according to claim 1 is used.

45. An ink cartridge comprising at least an ink reservoir for storing the dark yellow ink composition contained in the ink set according to claim 1.

46. An ink jet recording apparatus for ejecting droplets of an ink composition and depositing the droplets onto a recording medium to perform printing, said ink jet recording apparatus comprising:
  the ink cartridge according to claim 45;
  a recording head for ejecting an ink composition contained in the ink cartridge; and
  means for supplying the ink composition from the ink cartridge to the recording head.

47. An ink cartridge comprising partitioned ink reservoirs which are independent of each other and respectively contain the ink compositions constituting the ink set according to claim 1.

48. An ink cartridge set comprising a combination of a plurality of independent ink cartridges including:
  a dark yellow ink cartridge containing the dark yellow ink composition included in the ink set according to claim 1; and a normal yellow ink cartridge containing the normal yellow ink composition included in the ink set.

49. The ink cartridge set according to claim 48, which further comprises:
a magenta ink cartridge containing a magenta ink composition; and
a cyan ink cartridge containing a cyan ink composition.

50. The ink cartridge set according to claim 48, which further comprises:
a light magenta ink cartridge containing a magenta ink composition having lower color density out of two magenta ink compositions different from each other in color density;
a magenta ink cartridge containing a magenta ink composition having higher color density out of the two magenta ink compositions different from each other in color density;
a light cyan ink cartridge containing a cyan ink composition having lower color density out of two cyan ink compositions different from each other in color density; and
a cyan ink cartridge containing a cyan ink composition having higher color density out of the two cyan ink compositions different from each other in color density.

51. The ink cartridge set according to claim 48, which further comprises
a black ink cartridge containing a black ink composition.

52. The ink cartridge set according to claim 48, wherein
at least two ink cartridges included in the cartridge set are attached to each other by physical means.

53. An ink jet recording apparatus for ejecting droplets of an ink composition and depositing the droplets onto a recording medium to perform printing, said ink jet recording apparatus comprising:
the ink cartridge set according to claim 48;
a recording head for ejecting ink compositions contained in the ink cartridges constituting the ink cartridge set; and
means for supplying the ink compositions from the ink cartridges to the recording head.

54. A dark yellow ink composition for use in a recording method at least using two yellow ink compositions of a normal yellow ink composition and a dark yellow ink composition,
said dark yellow ink composition being used in the ink set according to claim 1.

55. An ink set comprising at least a normal yellow ink composition and a dark yellow ink composition, wherein
for the dark yellow ink composition, the absolute value of b*/a* in the L*a*b* color system as calculated from the spectral characteristics of a 1000-fold dilution of the dark yellow ink composition with water is not less than 0.83, and the b* value is not less than zero (0) and is smaller than the b* value of the normal yellow ink composition as calculated from the spectral characteristics of a 1000-fold dilution of the normal yellow ink composition with water.

56. A dark yellow ink composition for use in a recording method at least using two yellow ink compositions of a normal yellow ink composition and a dark yellow ink composition,
said dark yellow ink composition comprising C.I. Direct Black 195, C.I. Direct Yellow 86, and C.I. Direct Yellow 173 as colorants.

57. The dark yellow ink composition according to claim 56, which further comprises, as a colorant, a magenta dye represented by formula M-4: M-4

58. The dark yellow ink composition according to claim 57, which further comprises C.I. Direct Blue 199 as a colorant.

59. A dark yellow ink composition comprising, as colorants, at least one first colorant selected from the group consisting of compounds represented by formula (I) and (II)

wherein
$R_1$, $R_1'$, $R_2$, and $R_2'$ each independently represent $CH_3$ or $OCH_3$; and
A and A' each independently represent a group having a structure selected from the group consisting of wherein
M represents hydrogen, lithium, sodium, potassium, ammonium, or an organic amine; and
n is an integer of 1 or 2, and at least one second colorant selected from the group consisting of magenta, cyan, and black dyes.

60. The dark yellow ink composition according to claim 59, wherein the first colorant is selected from the group consisting of C.I. Direct Yellow 50, C.I. Direct Yellow 55, C.I. Direct Yellow 86, C.I. Direct Yellow 132, and C.I. Direct Yellow 173.

61. The dark yellow ink composition according to claim 59 wherein the second colorant is selected from the group consisting of:

magenta dyes selected from compounds represented by formula (III)

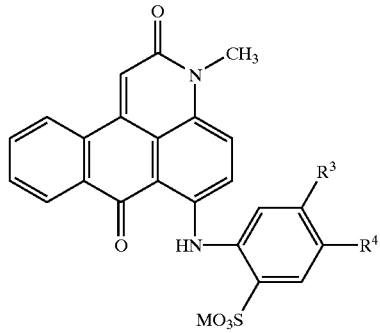

(III)

wherein

M represents hydrogen, lithium, sodium, potassium, ammonium, or an organic amine, and $R^3$ represents chlorine or a group represented by formula

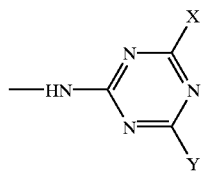

wherein

X represents an anilino group substituted by at least one $SO_3M$, and

Y represents OH, chlorine, or a morpholino group, $R^4$ represents hydrogen, chlorine, $SO_3M$, or a C1–C4 alkyl group, or compounds represented by formula (IV)

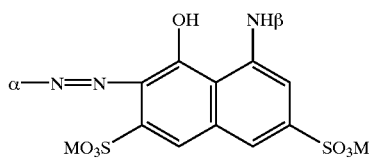

(IV)

wherein

α represents a C1–C4 alkyl or alkoxy group or an OH—, $SO_3H$—, or COOM-substituted phenyl or naphthyl group, β represents hydrogen or a group represented by formula

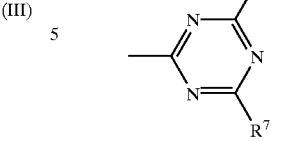

wherein $R^5$ represents hydrogen or an OH— or COOH— substituted C1–C4 alkyl group, $R^6$ represents an OH—, $OCH_3$—, $OC_2H_5$—, $SO_3M$—, or COOM-substituted C1–C4 alkyl or phenyl group, $R^7$ represents OH, COOH, or $NHR^8$, and $R^8$ represents an $SO_3M$— or COOH-substituted $C_1$–C4 alkyl group, M represents hydrogen, lithium, sodium, potassium, ammonium, or an organic amine;

cyan dyes selected from compounds represented by formula (V)

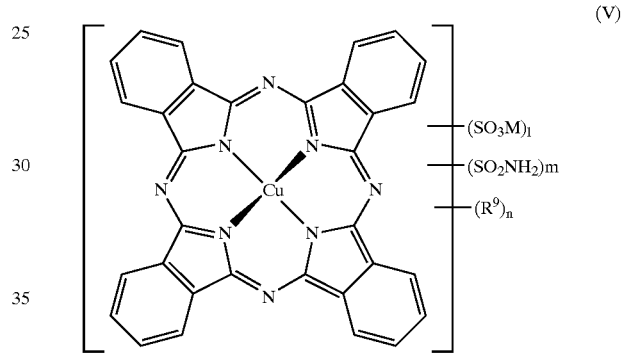

(V)

wherein $R^9$ represents OH, COOM, or $R^{10}$COOM wherein $R^{10}$ represents C4–C9 alkyl group, and l, m, and n are each 0 to 4, provided that (l+m+n)=4; and black dyes selected from C.I. Direct Black 195, C.I. Food Black 2, C.I. Sulfur Black 1, or C.I. Reactive Black 31 or C.I. Reactive Black 35.

62. The dark yellow ink composition according to claim 59, wherein the dark yellow ink composition has a lightness of 20 to 90, and the lightness of the ink composition is the lightness of an L*a*b* color system as calculated from the spectral characteristics of a 1000-fold dilution of the ink composition with water.

63. The dark yellow ink composition according to claim 62, wherein the dark yellow ink composition has a lightness of 30 to 80.

* * * * *